US010103655B2

(12) United States Patent
Horiuchi et al.

(10) Patent No.: US 10,103,655 B2
(45) Date of Patent: Oct. 16, 2018

(54) ROTARY ELECTRICAL MACHINE SYSTEM, DRIVE UNIT FOR ROTARY ELECTRICAL MACHINE, METHOD FOR DRIVING ROTARY ELECTRICAL MACHINE AND VEHICLE

(71) Applicant: KABUSHIKI KAISHA TOSHIBA, Minato-ku, Tokyo (JP)

(72) Inventors: Yosuke Horiuchi, Tokyo (JP); Shinya Sakurada, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 15/267,465

(22) Filed: Sep. 16, 2016

(65) Prior Publication Data

US 2017/0279386 A1 Sep. 28, 2017

(30) Foreign Application Priority Data

Mar. 22, 2016 (JP) ................................ 2016-057459

(51) Int. Cl.
*H02P 6/15* (2016.01)
*B60L 11/18* (2006.01)
(Continued)

(52) U.S. Cl.
CPC .......... *H02P 6/153* (2016.02); *B60L 11/1803* (2013.01); *H02K 1/02* (2013.01); (Continued)

(58) Field of Classification Search
CPC .............. B60L 11/1803; B60L 2210/42; B60L 2220/16; H02K 1/02; H02P 6/08; H02P 6/153; H01F 1/0557; H01F 1/015
See application file for complete search history.

(56) References Cited

U.S. PATENT DOCUMENTS 5,781,843 A * 7/1998 Anderson ............ B22F 3/1017 419/29
2010/0139333 A1* 6/2010 Maekawa ............ D06F 37/304 68/212
(Continued)

FOREIGN PATENT DOCUMENTS

JP 10-112946 4/1998
JP 2011-114236 6/2011
(Continued)

OTHER PUBLICATIONS

Miyamasu, et al. "A Study on Improvement in Permanent Magnet Synchronous Motor with High Permeability Magnet", IEEJ Transactions on Industry Applications, vol. 133, No. 9, Sep. 1, 2013, pp. 943-951.
(Continued)

*Primary Examiner* — Muhammad S Islam
(74) *Attorney, Agent, or Firm* — Amin, Turocy & Watson LLP

(57) ABSTRACT

According to one embodiment, a control device detects a field current in a rotary electrical machine, estimates a rate of rotation of a rotor of the machine based on the detected current, obtains a field voltage in the machine based on a difference between the estimated rate of rotation and a target rate of rotation, and controls the switching of an inverter based on the field voltage such that the rate of rotation follows the target rate of rotation. A permanent magnet using the machine is an R—Co permanent magnet containing 25 to 40 at % iron. The control device performs field-weakening control by increasing and decreasing the field voltage based on a negative-field current in accordance with the rate of rotation by a material of the permanent magnet.

15 Claims, 6 Drawing Sheets

Start
Detect field-component current and torque-component current — S1
Estimate rate of rotation — S2
Obtain deviation between target rate of rotation and estimated rate of rotation — S3
Produce field-component voltage and torque-component voltage — S4
Apply switching control to inverter — S5

(51) Int. Cl.
*H02K 1/02* (2006.01)
*H02P 6/08* (2016.01)

(52) U.S. Cl.
CPC ............. *H02P 6/08* (2013.01); *B60L 2210/42* (2013.01); *B60L 2220/16* (2013.01)

(56) References Cited

U.S. PATENT DOCUMENTS

| | | | | |
|---|---|---|---|---|
| 2010/0140003 | A1* | 6/2010 | Saha | B60L 15/025 180/65.285 |
| 2011/0278976 | A1* | 11/2011 | Horiuchi | C22C 19/07 310/152 |
| 2013/0241681 | A1 | 9/2013 | Horiuchi et al. | |
| 2013/0241682 | A1* | 9/2013 | Horiuchi | H01F 1/0557 335/302 |
| 2015/0137648 | A1* | 5/2015 | Kato | H02K 1/276 310/156.53 |

FOREIGN PATENT DOCUMENTS

| | | |
|---|---|---|
| JP | 2012-175738 | 9/2012 |
| JP | 2013-93936 | 5/2013 |
| JP | 2013-191814 | 9/2013 |
| JP | 2013-191815 | 9/2013 |
| JP | 2014-140045 | 7/2014 |
| JP | 2014-187802 | 10/2014 |
| JP | 2014-241419 | 12/2014 |
| JP | 2014-241420 | 12/2014 |

OTHER PUBLICATIONS

International Search Report for International Patent Application No. PCT/JP2016/075709 dated Nov. 8, 2016, 4 pages.

* cited by examiner

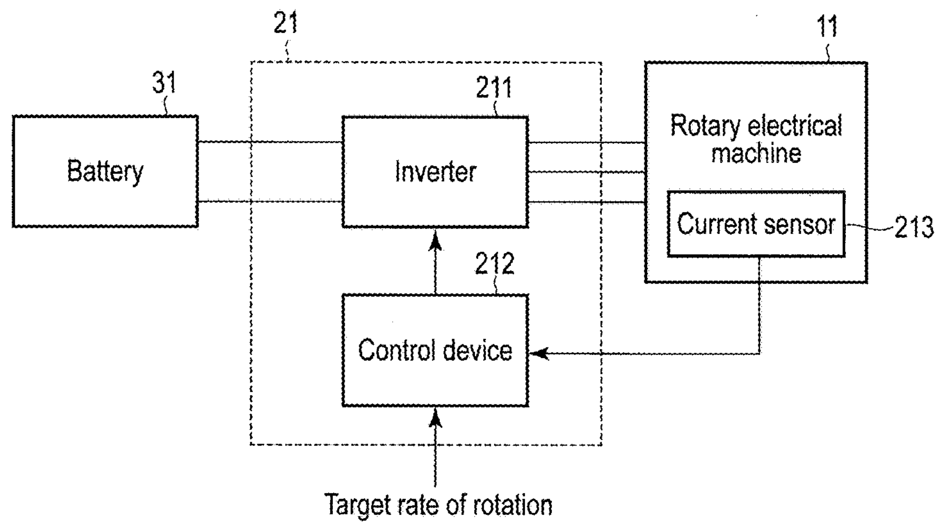
F I G. 1A
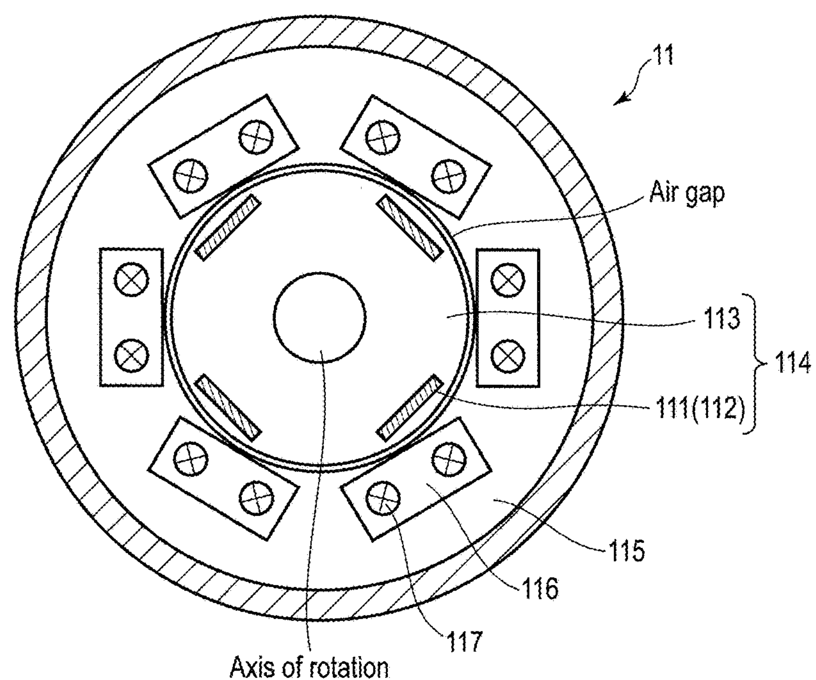
F I G. 1B

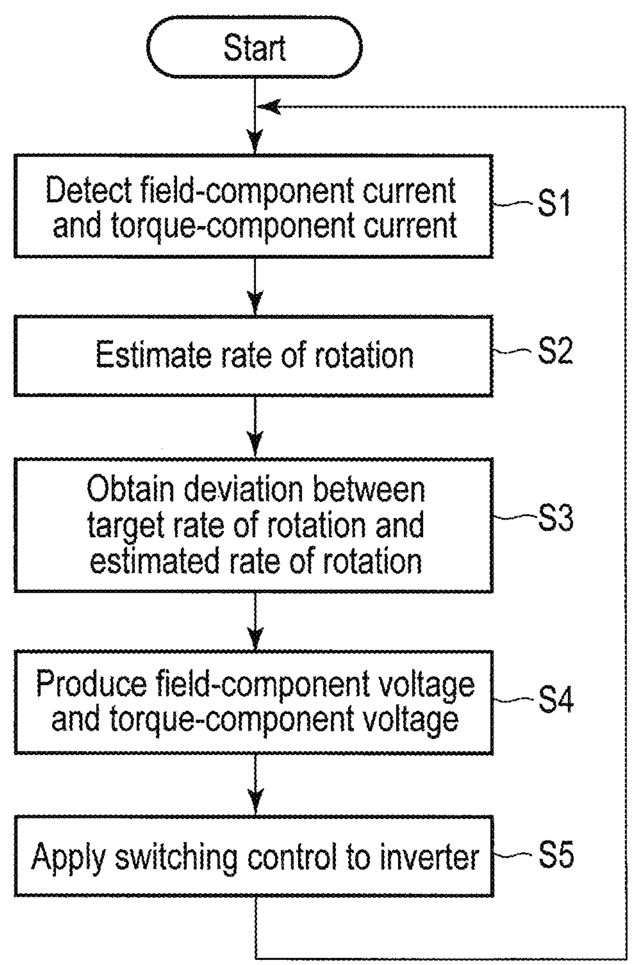
F I G. 2

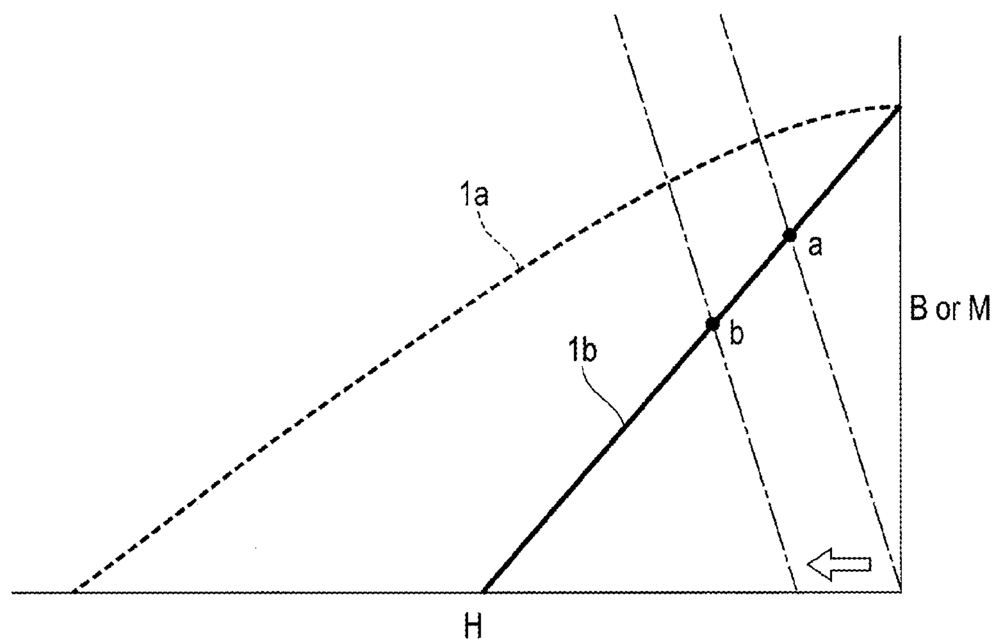
F I G. 3
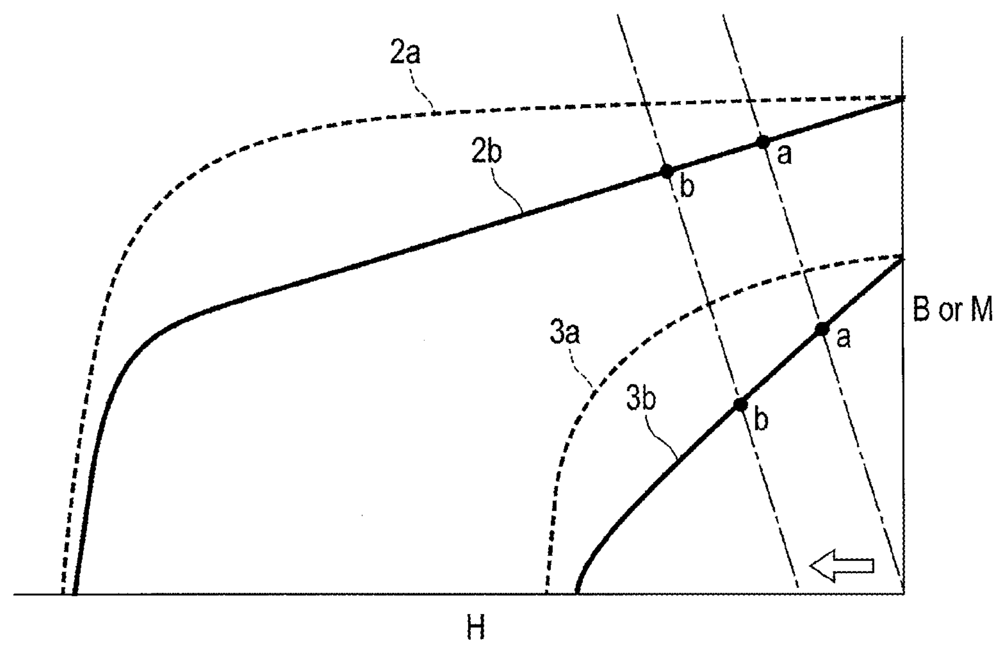
F I G. 4

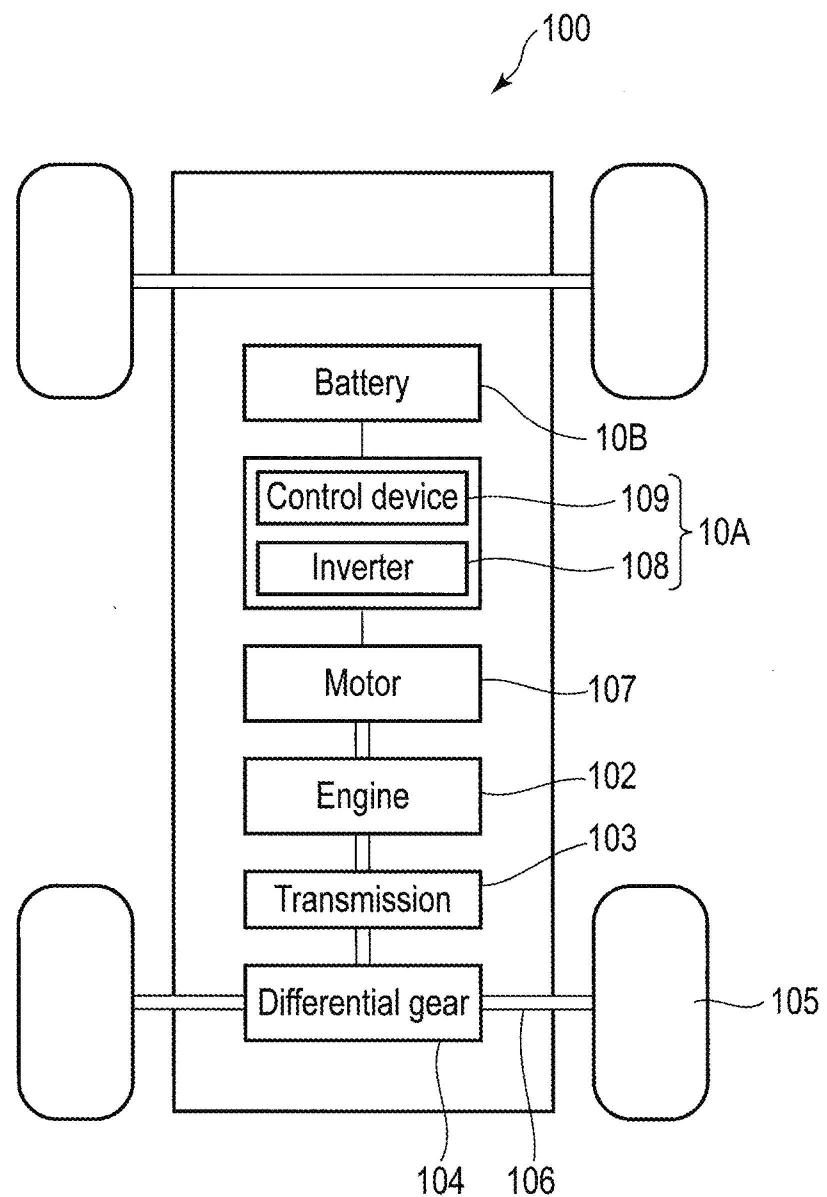
F I G. 8

ROTARY ELECTRICAL MACHINE SYSTEM, DRIVE UNIT FOR ROTARY ELECTRICAL MACHINE, METHOD FOR DRIVING ROTARY ELECTRICAL MACHINE AND VEHICLE

CROSS-REFERENCE TO RELATED APPLICATIONS

This application is based upon and claims the benefit of priority from Japanese Patent Application No. 2016-057459, filed Mar. 22, 2016, the entire contents of which are incorporated herein by reference.

FIELD

Embodiments described herein relate generally to a permanent-magnet rotary electrical machine system, a drive unit for a permanent-magnet rotary electrical machine, a method for driving the rotary electrical machine, and a vehicle.

BACKGROUND

Automobiles and railcars use a permanent-magnet rotary electrical machine for a motor or a generator. As the permanent magnet, an Nd—Fe—B magnet is employed to increase efficiency. The magnetic flux density of the Nd—Fe—B magnet is high. Thus, the torque can be high by using an Nd—Fe—B sintered magnet in a rotary electrical machine.

In the motors used for automobiles and railcars, variable speed drive is performed from slow to fast rotation. In conventional motors using Nd—Fe—B sintered magnets, high torque is obtained on the slow rotation side. However, an induced voltage (back electromotive force) is produced on the fast rotation side, and thus, the output is reduced.

In permanent magnets such as Nd—Fe—B sintered magnets, flux linkage is produced with constant strength at any time. The induced voltage by the permanent magnet is increased in proportion to the rate of rotation. Thus, the voltage of the motor reaches the upper limit of the source voltage in fast rotation. The current necessary for output is not supplied. As a result, the output is dramatically reduced. Further, the motor cannot be driven in the range of fast rotation.

To diminish the effect of the induced voltage in fast rotation, for example, a field-weakening control method can be considered. In this method, the magnetic flux density is reduced by producing a reverse magnetic field. In this manner, the number of flux linkages is reduced. However, in permanent magnets having a high magnetic flux density, such as Nd—Fe—B sintered magnets, the magnetic flux density cannot be sufficiently decreased in fast rotation.

Even if a field-weakening control method is used in fast rotation, the effect is insufficient in rotary electrical machines using permanent magnets having a high magnetic flux density.

Embodiments described herein aim to prevent reduction in output in a permanent-magnet rotary electrical machine or vehicle performing variable speed drive from slow to fast rotation.

According to one embodiment, a permanent-magnet rotary electrical machine system comprises a rotary electrical machine, an inverter and a control module. The rotary electrical machine is a permanent-magnet rotary electrical machine which forms a magnetic pole of a rotor with a permanent magnet. The inverter produces an AC voltage by switching and outputs the AC voltage to the rotary electrical machine as drive power. The control module detects a field-component current in the rotary electrical machine, estimates a rate of rotation of the rotor of the rotary electrical machine based on the detected current, obtains a field-component voltage in the rotary electrical machine based on a difference between the estimated rate of rotation of the rotor and a target rate of rotation, and controls the switching of the inverter based on the field-component voltage such that the rate of rotation of the rotor follows the target rate of rotation. The permanent magnet is an R—Co permanent magnet containing 25 to 40 at % iron, where R is at least one element selected from rare-earth elements. The control module performs field-weakening control by increasing and decreasing the field-component voltage based on a negative-field-component current in accordance with the rate of rotation of the rotor by a material of the permanent magnet.

BRIEF DESCRIPTION OF THE DRAWINGS

FIG. 1A shows the entire configuration of a rotary electrical machine system according to the present embodiment.

FIG. 1B shows the structure of a rotary electrical machine to the present embodiment.

FIG. 2 is a flowchart showing the flow of control performed by a control device used for the system according to the present embodiment.

FIG. 3 shows an example of the magnetic properties of a permanent magnet used for a rotary electrical machine according to the present embodiment.

FIG. 4 shows an example of the magnetic properties of a permanent magnet according to a comparative example.

FIG. 8 shows the configuration of the drive train of a hybrid automobile comprising the rotary electrical machine system according to the present embodiment.

DETAILED DESCRIPTION

Figure 5:
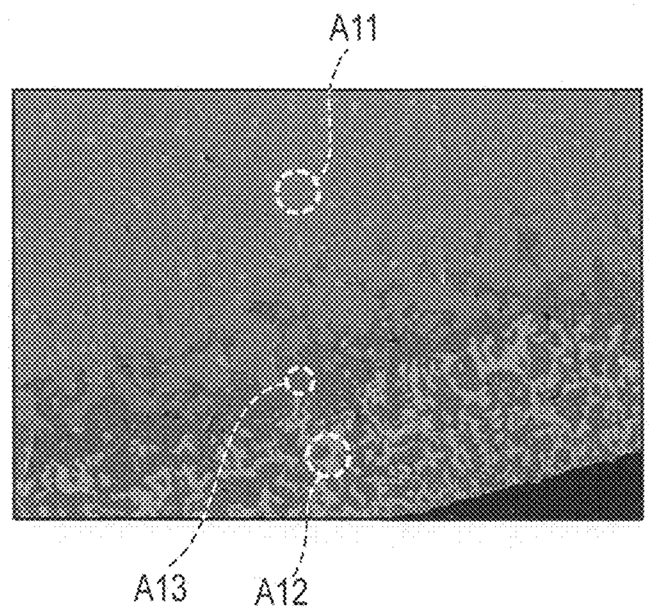
FIG. 5 shows an example of a bright-field image by STEM-EDX.

Various embodiments will be described hereinafter with reference to the accompany drawings. The drawings are merely schematic depictions. For example, the relationships between the thicknesses and the dimensions on a plane, or the ratios of thicknesses of layers represented in the drawings do not necessarily reflect what is actually implemented. Substantially the same elements in the embodiments are denoted by the same numbers or symbols, duplicate explanations being omitted.

In general, according to one embodiment, there are provided a permanent-magnet rotary electrical machine system comprises a rotary electrical machine, an inverter and a control module. The rotary electrical machine is a permanent-magnet rotary electrical machine which forms a magnetic pole of a rotor with a permanent magnet. The inverter produces an AC voltage by switching and outputs the AC voltage to the rotary electrical machine as drive power. The control module detects a field-component current in the rotary electrical machine, estimates a rate of rotation of the rotor of the rotary electrical machine based on the detected current, obtains a field-component voltage in the rotary electrical machine based on a difference between the estimated rate of rotation of the rotor and a target rate of rotation, and controls the switching of the inverter based on the field-component voltage such that the rate of rotation of the rotor follows the target rate of rotation. The permanent magnet is an R—Co permanent magnet containing 25 to 40 at % iron, where R is at least one element selected from rare-earth elements. The control module performs field-weakening control by increasing and decreasing the field-component voltage based on a negative-field-component current in accordance with the rate of rotation of the rotor by a material of the permanent magnet.

FIG. 1A shows the entire configuration of a rotary electrical machine system according to the present embodiment. FIG. 1B shows the structure of a rotary electrical machine according to the present embodiment.

According to the present embodiment, as shown in FIG. 1A, a rotary electrical machine system comprises a permanent-magnet rotary electrical machine 11, a drive unit 21 which drives the rotary electrical machine 11, and a battery 31.

As shown in FIG. 1B, the rotary electrical machine 11 forms a magnetic pole 112, using a permanent magnet 111. The magnetic pole 112 is provided inside a rotor core 113 to form a rotor 114. A stator 115 is provided in the outer circumference of the rotor 114 with an air gap interposed. An armature core 116 and an armature winding 117 are provided in the stator 115. The armature winding 117 forms a magnetic field and reversibly changes the flux width of the permanent magnet 111 which forms the magnetic pole 112 of the rotor 114.

In comparison with a common high-efficiency permanent magnet, a permanent magnet having a high recoil permeability is used as the permanent magnet 111 provided inside the core 113 of the rotor 114. The magnetic flux density (in other words, the flux content) of the permanent magnet 111 is variable. Since the direction of magnetization of the permanent magnet 111 bisects the Q-axial direction at right angles, the permanent magnet 111 can be magnetized by the D-axial current without an effect of the Q-axial current. By supplying a drive current from the drive unit 21 to the armature winding 117 provided in the stator 115, the magnetic field directly affects the permanent magnet 111.

The drive unit 21 which drives the rotary electrical machine 11 comprises an inverter 211, a control device 212 and a current sensor 213.

The inverter 211 produces an AC voltage by switching the DC voltage supplied from the battery 31, and applies the AC voltage to the armature winding 117 as the drive power of the rotary electrical machine 11.

The control device 212 basically performs the process shown in FIG. 2. The field-component current and the torque-component current in the rotary electrical machine 11 are detected by the current sensor 213 provided in the rotary electrical machine 11 (step S1). The rate of rotation of the rotor 114 is estimated based on the detected currents (step S2). The deviation between the target rate of rotation input as an instruction and the estimated rate of rotation is obtained (step S3). The field-component voltage and the torque-component voltage in the rotary electrical machine 11 are obtained based on the deviation (step S4). The switching of the inverter 211 is controlled based on the field-component voltage and the torque-component voltage (step S5). The process of steps S1 to S5 is repeated such that the rate of rotation follows the target rate of rotation.

The permanent magnet 111 is formed of a material which has a composition containing at least one element R selected from rare-earth elements, at least one element M selected from zirconium, titanium and hafnium, iron, copper and cobalt, in which the amount of iron is 25 to 40 at %. The specific compositional structure is explained later.

In step S3, a negative-field-component current (field-weakening current) which increases with the rise in the estimated rate of rotation and decreases with the declination in the estimated rate of rotation is obtained by the control device 212 based on the recoil permeability exhibited by the material of the permanent magnet 111 (step S31). The control device 212 adds the obtained current to the target field-component current equivalent to the target rate of rotation (step S32). Thus, in the present embodiment, field-weakening control is performed by modifying the target field-component current by a field-weakening current.

A table conversion is preferably applied to the above negative-field-component current based on the recoil permeability in advance.

As described above, in comparison with a common high-efficiency permanent magnet, the material of the permanent magnet 111 of the present embodiment has a high recoil permeability. In the present embodiment, variable speed drive can be performed in a wide range from low to high speed. Further, the efficiency is high in the entire operation range from low to high speed. Thus, it is possible to reduce the load on the power element of the inverter 211.

Now, this specification explains a permanent magnet which has a high recoil permeability and is suitably used in the above rotary electrical machine.

FIG. 3 shows an example of the magnetic properties of the permanent magnet applied to the present embodiment. FIG. 4 shows an example of the magnetic properties of a permanent magnet according to a comparative example. In FIG. 3 and FIG. 4, the horizontal axis represents the magnetic field H, and the vertical axis represents the magnetic flux density B or the magnetization M.

In FIG. 3, curve 1*a* shows the M-H curve of the permanent magnet of the present embodiment. Curve 1*b* shows the B-H curve of the permanent magnet of the present embodiment. The permanent magnet of the present embodiment has high magnetization on the B-H curve. When a reverse magnetic field is applied by a field-weakening control method, the decrease in magnetization from operation point a to operation point b on the B-H curve is large. In the permanent magnet of the present embodiment, the recoil permeability on the B-H curve is high.

The recoil permeability is defined as follows. A sintered magnet is magnetized by a magnetization device or a pulsed magnetic field. The magnetic properties of the magnet are measured. Thus, a B-H curve is obtained. An inclination is obtained by applying linear fitting to the B-H curve. A value of the inclination is the recoil permeability.

The permanent magnet of the present embodiment is characterized in that no knick is formed in the B-H curve. A knick is a transition point at which the inclination is changed when the magnetic flux density is decreased by an external magnetic field, and thus, the magnetic flux density is rapidly decreased.

In FIG. 4, curve 2*a* shows the M-H curve of a neodymium sintered magnet. Curve 2*b* shows the B-H curve of the neodymium sintered magnet. In the neodymium sintered magnet, as shown in FIG. 4, the decrease in magnetization from operation point a to operation point b is smaller than that in the permanent magnet of the present embodiment. In the neodymium sintered magnet, it is difficult to decrease the magnetic flux density even if a field-weakening control method is used. In field weakening, the magnetic flux of the magnet is cancelled by the magnetic flux of the field-weakening current. However, the space waveform of the magnetic flux of the field-weakening current is different from that of the magnetic flux of the magnet. Therefore, although the magnetic flux of a spatial fundamental component can be cancelled, a spatial harmonic component is not cancelled, or even expands in some cases.

A spatial harmonic component leads to an iron loss and a magnet eddy-current loss in fast rotation. Further, the temperature of the magnet is increased because of the magnet eddy-current loss. Thus, thermal demagnetization is easily produced. Particularly, in an embedded magnet type, the magnetic flux of the magnet is close to a square wave, and many spatial harmonics are included. Since the gap is short, the spatial harmonic of a slot ripple component is large. Thus, the problem is serious. The low spatial harmonic which is not cancelled and remains is modulated by a slot ripple and becomes a high spatial harmonic. This is considered as a factor of the problem.

To reduce the magnetic flux density, for example, bond magnets may be used. In FIG. 4, curve 3*a* shows the M-H curve of a neodymium bond magnet. Curve 3*b* shows the B-H curve of the neodymium bond magnet. As shown in FIG. 4, the decrease in magnetization from operation point a to operation point b in the neodymium bond magnet is larger than that in the neodymium sintered magnet. In other words, the recoil permeability of the neodymium bond magnet is higher than that of the neodymium sintered magnet. However, the remnant magnetization is low, and the coercivity Hcj is small. Thus, when variable speed drive is performed in a range from low to high speed in a motor comprising this magnet, it is difficult to obtain high torque in slow rotation.

In addition to neodymium bond magnets, for example, Al—Ni—Co magnets in an imperfect state of magnetization are considered as magnets having a high recoil permeability. However, the remnant magnetization is small in Al—Ni—Co magnets in an imperfect state of magnetization in a manner similar to that of neodymium bond magnets. Thus, it is difficult to obtain high torque in slow rotation. In neodymium magnets and samarium magnets, the magnetization is high, and high torque can be obtained. However, the recoil permeability of these magnets is approximately 1 in general. Thus, it is difficult to obtain a high recoil permeability.

The permanent magnet of the present embodiment has a remnant magnetization greater than or equal to 1.16. The coercivity Hcj on the M-H curve is greater than or equal to 1000 kA/m. The recoil permeability is greater than or equal to 1.15. The remnant magnetization is preferably greater than or equal to 1.2. The coercivity is preferably greater than or equal to 1200 kA/m. The recoil permeability is preferably greater than or equal to 1.2. In this manner, the permanent magnet of the present embodiment has a high recoil permeability as well as a high magnetization and a high coercivity. Thus, it is possible to prevent reduction in output in the rotary electrical machine which performs variable speed drive in a range from low to high speed.

In the above rotary electrical machine, specifically, the rotor is provided by arranging the magnetic pole inside the rotor core. The stator is provided in the outer circumference of the rotor with an air gap interposed. Further, the armature winding is provided in the stator. The flux content of the permanent magnet which structures the magnetic pole of the rotor is reversibly changed by a magnetic field produced by the armature winding. In a conventional rotary electrical machine, a plurality of magnetic poles are provided in the rotor core such that the rotor has a high magnetization and a high recoil permeability. However, two or more magnets are required, and thus, the structure becomes complicated. In addition, the number of manufacturing steps is increased.

In the permanent magnet of the present embodiment, both a high magnetization and a high recoil permeability are obtained by only one magnet. Thus, it is possible to simplify the structure of the rotary electrical machine such as a motor or generator and prevent increase in the number of manufacturing steps.

Examples of the permanent magnet having the above characteristics are explained below. The permanent magnet of the present embodiment comprises a sintered body having a composition represented by an R—Co form containing 25 to 40 at % iron, where R is at least one element selected from rare-earth elements. Specifically, the permanent magnet of the present embodiment comprises a sintered body having a composition represented by the composition formula $R_pFe_qM_rCu_tCo_{100-p-q-r-t}$, where R is at least one element selected from rare-earth elements, M is at least one element selected from a group consisting of Zr, Ti and Hf, p satisfies $10.8 \leq p \leq 12.5$ at %, q satisfies $25 \leq q \leq 40$ at %, r satisfies $0.88 \leq r \leq 3.5$ at %, and t satisfies $3.5 \leq t \leq 13.5$ at %.

In the above composition formula, R is at least one element which can cause the magnet material to have a large magnetic anisotropy. As R, for example, one or more elements selected from rare-earth elements including yttrium (Y) can be used. For example, samarium (Sm), cerium (Ce), neodymium (Nd) and praseodymium (Pr) can be used. In particular, Sm is preferably used. When a plurality of elements including Sm are used for the R elements, it is possible to improve the characteristics of the magnet material, for example, the coercivity, by setting the concentration of Sm to 50 at % or more of all the elements applicable as the R elements. The concentration of Sm is more preferably 70 at % or more of the elements applicable as the R elements, and further preferably 90 at % or more.

The coercivity may be increased by setting the concentration of elements applicable as the R elements so as to be, for example, greater than or equal to 10.8 at % and less than or equal to 12.5 at %. When the concentration of elements applicable as the R elements is less than 10.8 at %, a large amount of α-Fe is deposited, and thus, the coercivity is decreased. When the concentration of elements applicable as the R elements exceeds 12.5 at %, the saturated magnetization is decreased. The concentration of elements applicable as the R elements is more preferably greater than or equal to 10.9 at % and less than or equal to 12.1 at %, and further preferably greater than or equal to 11.0 at % and less than or equal to 12.0 at %.

In the above composition formula, M is at least one element which can exhibit a large coercivity in the composition containing Fe with a high concentration. As M, for example, one or more elements selected from a group consisting of Titanium (Ti), zirconium (Zr) and Hafnium (Hf) are used. When the amount r of M exceeds 4.3 at %, a different phase containing an excessive amount of M is easily produced, and thus, both the coercivity and the magnetization are easily decreased. When the amount r of M is less than 0.88 at %, the effect of increasing the concentration of Fe is easily diminished. Thus, the amount r of M is preferably greater than or equal to 0.88 at % and less than or equal to 3.5 at %. The amount r of M is more preferably greater than or equal to 1.14 at % and less than or equal to 3.4 at %, further preferably greater than 1.49 at % and less than or equal to 2.24 at %, and yet further preferably greater than or equal to 1.55 at % and less than or equal to 2.23 at %.

M preferably at least contains Zr. In particular, when the amount of Zr in M is greater than or equal to 50 at %, the coercivity of the permanent magnet can be increased. By contrast, Hf is particularly expensive out of the M elements. Thus, when Hf is used, the amount of Hf is preferably less. For example, the amount of Hf is preferably less than 20 at % of the M elements.

Cu is an element which can cause the magnet material to exhibit a high coercivity. The amount of Cu is preferably, for example, greater than or equal to 3.5 at % and less than or equal to 13.5 at %. When Cu is contained more than this amount, the magnetization is significantly decreased. When Cu is contained less than this amount, it is difficult to obtain a high coercivity or a good squareness ratio. The amount t of Cu is more preferably greater than or equal to 3.9 at % and less than or equal to 10.0 at %, and further preferably greater than or equal to 4.1 at % and less than or equal to 5.8 at %.

Fe is an element which mainly functions to magnetize the magnet material. The saturated magnetization of the magnet material can be increased when a large amount of Fe is contained. However, when Fe is excessively contained, it is difficult to obtain a desired crystalline phase because of deposition of α-Fe and phase separation. Thus, the coercivity may be reduced. In consideration of these factors, the amount q of Fe is preferably greater than or equal to 25 at % and less than or equal to 40 at %. The amount q of Fe is more preferably greater than or equal to 26 at % and less than or equal to 36 at %, and further preferably greater than or equal to 30 at % and less than or equal to 33 at %.

Co is an element which functions to magnetize the magnet material and causes it to exhibit a high coercivity. When a large amount of Co is contained, it is possible to obtain a high Curie temperature and improve the thermal stability of the magnet. When the amount of Co is less, these effects are small. However, when Co is excessively added, the proportion of Fe is relatively decreased. Thus, the magnetization may be reduced. It is possible to improve the properties of the magnet, for example, the coercivity, by replacing the composition less than or equal to 20 at % of Co by one or more elements selected from a group consisting of Ni, V, Cr, Mn, Al, Si, Ga, Nb, Ta and W.

The permanent magnet of the present embodiment has a two-dimensional metal structure. The two-dimensional metal structure includes a main phase having a hexagonal $Th_2Zn_{17}$ crystalline phase (2-17 crystalline phase), and a grain boundary phase provided between the crystalline grains constituting the main phase. The main phase includes a cell phase having a 2-17 crystalline phase, a Cu-rich phase having a hexagonal $CaCu_5$ crystalline phase (1-5 crystalline phase), and a platelet phase.

The Cu-rich phase is preferably formed so as to surround the cell phase. The above structure may be called a cell structure. The Cu-rich phase includes a cell-wall phase which divides the cell phase. The c-axis of the $Th_2Zn_{17}$ crystalline phase is preferably parallel to the axis of easy magnetization. The parallel state may include a state within ±10 degrees from a parallel direction (in other words, substantially a parallel state).

In the Cu-rich phase, the concentration of Cu is high. The concentration of Cu in the Cu-rich phase is higher than that in the $Th_2Zn_{17}$ crystalline phase. For example, the concentration of Cu in the Cu-rich phase is preferably greater than or equal to 1.2 times that in the $Th_2Zn_{17}$ crystalline phase. For example, the Cu-rich phase is present in a linear or plate form on a cross-sectional surface including the c-axis in the $Th_2Zn_{17}$ crystalline phase. The structure of the Cu-rich phase is not particularly limited. For example, a hexagonal $CaCu_5$ crystalline phase (1-5 crystalline phase) is considered. The permanent magnet may comprise a plurality of Cu-rich phases having different phases.

The domain-wall energy of the Cu-rich phase is higher than that of the $Th_2Zn_{17}$ crystalline phase. The difference in domain-wall energy is the barrier of domain wall motion. When the Cu-rich phase functions as a pinning site, it is possible to prevent domain wall motion between a plurality cell phases. In particular, the effect of preventing domain wall motion is improved by forming a cell structure. This may be called a domain wall pinning effect. Thus, the Cu-rich phase is preferably formed so as to surround the cell phase. A permanent magnet having this structure may be called a pinning permanent magnet.

In an Sm—Co magnet containing 25 at % or more Fe, the concentration of Cu in the Cu-rich phase is preferably greater than or equal to 10 at % and less than or equal to 60 at %. By increasing the concentration of Cu in the Cu-rich phase, the coercivity or squareness ratio can be improved. In an area having a high concentration of Fe, the concentration of Cu in the Cu-rich phase easily varies. For example, a Cu-rich phase having a large domain wall pinning effect and a Cu-rich phase having a small domain wall pinning effect are produced. Thus, the coercivity and the squareness ratio are decreased.

When the domain wall which is off the pinning site moves, the magnetization is inverted by the move. Thus, the magnetization is reduced. If the domain wall is concurrently off the pinning site with a constant magnetic field when an external magnetic field is applied, the magnetization is difficult to decrease because of the application of the magnetic field. Thus, an excellent squareness ratio can be obtained. In other words, if the domain wall is off the pinning site with a magnetic field less than the coercivity when a magnetic field is applied, and the domain wall moves, the magnetization is reduced by the move. Thus, the squareness ratio is degraded.

The platelet phase is an M-rich platelet phase in which the concentration of M including Zr, etc., is higher than that in the $Th_2Zn_{17}$ crystalline phase. The platelet phase is formed perpendicularly to the c-axis of the $Th_2Zn_{17}$ crystalline phase. For example, when the concentration of Zr in the platelet phase is higher than that in the $Th_2Zn_{17}$ crystalline phase, the platelet phase may be called a Zr-rich platelet phase.

As stated above, the permanent magnet of the present embodiment comprises a composition at least containing a rare-earth element. Since the Curie point is high in the magnet, it is possible to realize excellent motor characteristics with a high temperature. While neodymium magnets are new creation permanent magnets, the above magnet is a pinning permanent magnet. In neodymium magnets, the domain wall is concurrently inverted when a reverse axis is produced. By contrast, in the permanent magnet of the present embodiment, domain wall motion is restricted by the Cu-rich phase. When the domain wall is off the pinning site, the move of the domain wall (magnetization inversion) is advanced. In other words, it is possible to prevent domain wall motion by the size of the cell structure formed by the $Th_2Zn_{17}$ crystalline phase, the Cu-rich phase and the platelet phase, and the composition of each phase.

The cell structure is fine when the concentration of R is high. The cell structure is coarse when the concentration of R is low. When a comparison is made with a sintered body having the same composition, the volume fraction of the cell-wall phase is high in a sample in which the cell structure is fine. The volume fraction of the cell-wall phase is low in a coarse sample. When a comparison is made in the concentration of Cu in the cell-wall phase, the finer the cell structure is, the lower the concentration of Cu is.

The Cu-rich phase affects the pinning strength of the domain wall. When the concentration of Cu is low, the pinning is weak, and the coercivity is small. When the cell structure is coarse, and the concentration of Cu is high in each Cu-rich phase, the pinning strength of each Cu-rich phase is high. Thus, the coercivity is large. If two or more different properties can be realized in one sintered body, one magnet can have an area in which the domain wall easily moves (in other words, the magnetization is easily inverted), and an area in which the magnetization is hardly inverted. In this way, it is possible to produce a distribution in the coercivity. As a result, the magnetization curve is precipitous, and the recoil permeability is large. Further, the knick is present on the high-magnetic-field side because of the large coercivity. Even when a large magnetic field is applied, no irreversible demagnetization is produced.

To realize the above magnet, the control of the concentration of R is important. In the permanent magnet of the present embodiment, the concentration of R is controlled by using an oxidation phenomenon. In the permanent magnet of the present embodiment, the sintered body preferably has a phase containing an oxide of rare-earth elements provided so as to be exposed from the surface of the sintered body. The thickness of the phase containing the oxide of rare-earth elements is greater than or equal to 50 μm and less than or equal to 800 μm.

The permanent magnet of the present embodiment has an area which is rich in R, and an area which is poor in R. For example, an oxide of R is formed by oxidizing R—Co powders. At this time, the R elements of the main phase are consumed. As a result, the concentration of R in the main phase is decreased. Thus, the coercivity in the surface portion is greater than that in the central portion which is less affected by oxidation. The coercivity is distributed in a single magnet. In this magnet, the concentration of oxygen in the surface portion is higher than that in the central portion. When the concentration of oxygen in the surface portion is greater than or equal to twice that in the central portion, the increase in the recoil permeability is significant.

The concentration of oxygen in the surface portion is defined as follows. A sintered body sample is cut such that the vicinity of the central portion is included in the cutting surface. Subsequently, energy-dispersive X-ray spectroscopy (EDX) is applied to a measurement area of 20 μm×20 μm in a region located in a depth within 100 μm from the surface of the sample on the cutting surface. This measurement is applied to one sample at five arbitrary position. The mean value of this measurement is defined as the concentration of oxygen in the surface portion $O_{surface}$.

The concentration of oxygen in the central portion is defined as follows. EDX is applied to an area of 20 μm×20 μm in a region located inside the sintered body in a depth greater than or equal to 500 μm from the surface of the sample on the cutting surface. This measurement is applied to one sample at five arbitrary positions. The mean value of this measurement is defined as the concentration of oxygen in the central portion $O_{center}$.

When the thickness of the phase containing the oxide of R in which the ratio of the concentration of oxygen in the surface portion $O_{surface}$ to the concentration of oxygen in the central portion $O_{center}$ ($O_{surface}/O_{center}$) is greater than or equal to 2 is greater than or equal to 50 μm, the recoil permeability is remarkably improved. When the thickness is greater than 800 μm, the reduction in remnant magnetization has a profound effect, and further, the reduction in the coercivity because of the formation of excessive Sm-poor areas has a considerable impact. The thickness of the phase containing the oxide of R is more preferably greater than or equal to 100 μm and less than or equal to 500 μm.

Since the above permanent magnet includes a low-coercivity component, the recoil permeability is high. The coercivity Hcb on the B-H curve is less than or equal to 800 kA/m. However, a high-coercivity component is also included. Thus, as shown in FIG. 1, no knick is formed in the B-H curve even on the high-magnetic-field side exceeding 1000 kA/m. Thus, demagnetization hardly occurs. To prevent the formation of a knick in the B-H curve, the coercivity Hcj on the M-H curve is preferably greater than or equal to 1000 kA/m. Further, in the permanent magnet of the present embodiment, the ratio of the magnetic field Hk90 when the magnetization is 90% of remnant magnetization to the coercivity Hcj is less than or equal to 70. In this manner, the permanent magnet of the present embodiment has an excellent squareness ratio.

The composition of the permanent magnet is measured by, for example, inductively coupled plasma (ICP) emission spectrochemical analysis, scanning electron microscope energy-dispersive X-ray spectroscopy (SEM-EDX), transmission electron microscope-energy-dispersive X-ray spectroscopy (TEM-EDX), etc. The volume ratio of each phase is determined in a comprehensive manner by a combination of observation using an electronic microscope or optical microscope and X-ray analysis, etc., and may be obtained by an areal analytical method of an electron microgram of a cross-sectional surface of the permanent magnet. As the cross-sectional surface, the cross-sectional surface of substantially the central portion of the surface having the maximum area of the sample is used.

For example, the metal structures of the $Th_2Zn_{17}$ crystalline phase, the Cu-rich phase, etc., are confirmed as follows. First, a sample is observed by a scanning transmission electron microscope (STEM). At this time, the sample is observed by a SEM to specify the place of the grain boundary phase. The sample is processed such that the grain boundary phase becomes observable by using a focused ion beam (FIB). In this way, the efficiency of observation can be improved. The sample is a sample after an aging treatment. At this time, the sample is preferably an item which has not been magnetized.

Subsequently, the concentration of each element in the cell phase, the Cu-rich phase, etc., is measured by using scanning transmission electron microscope energy-dispersive X-ray spectroscopy (STEM-EDX).

Figure 6:
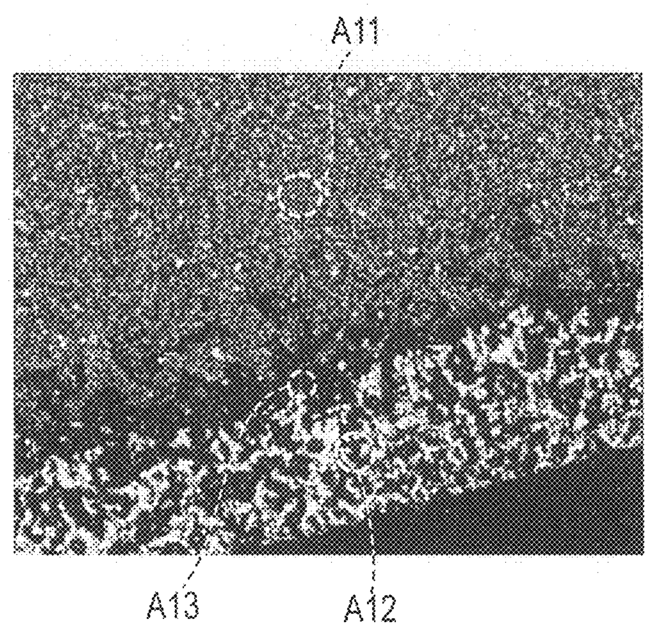
FIG. 6 shows a mapping image of Sm by STEM-EDX.
Figure 7:
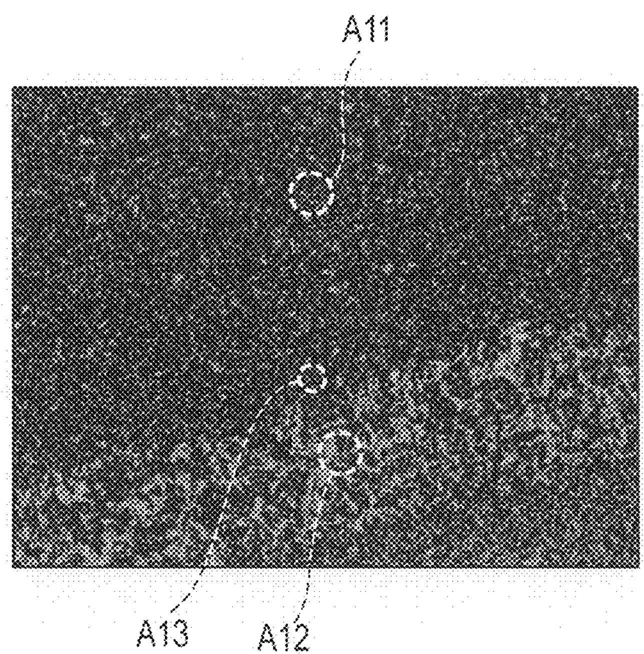
FIG. 7 shows a mapping image of oxygen by STEM-EDX.

When the concentration of each element is measured by STEM-EDX, a specimen for measurement is cut out from a portion which is internally at least 1 mm deep from the surface of the sample. The specimen is observed with 100 k magnification relative to a surface parallel to the axis of easy magnetization (c-axis). An example of the STEM bright-field image (reflective electron image) obtained in the above manner is shown in FIG. 5. The mapping image of Sm in the same field is shown in FIG. 6. The mapping image of oxygen is shown in FIG. 7.

In FIG. 6, area A11 is an area including the main phase. Relatively white areas are areas in which the concentration of Sm is high. In FIG. 7, relatively white areas are areas in which the concentration of oxygen is high. The area in which both the concentration of Sm and the concentration of oxygen are high when FIG. 6 is superimposed on FIG. 7 is equivalent to the phase (area A12) containing the oxide of R. Area A13, in which both the concentration of Sm and the concentration of oxygen are low, is provided between area A11 and area A12. This result shows that both an area having a high concentration of R and an area having a low concentration of R are formed in the sintered body. When the mapping image of FIG. 6 is compared with the mapping image of FIG. 7, the shades of white areas differ. This problem relates to image processing. The shades do not necessarily show the relative concentration of each element.

To measure the concentration of each element in each phase, a three-dimensional atomic probe (3DAP) may be used. In an analytical method using 3DAP, field evaporation is applied to the observation specimen by applying a voltage. The ions to which field evaporation is applied are detected by a two-dimensional detector. In this manner, the atomic arrangement is specified. The types of ions are identified based on the time of flight to the arrival at the two-dimensional detector. The ions which have been individually detected are continuously detected in a depth direction. The ions are arranged (reconstructed) in the detected order. In this way, a three-dimensional atomic distribution can be obtained. In comparison with the concentration measurement using TEM-EDX, the concentration of each element in each crystalline phase can be more accurately measured.

The measurement of the concentration of each element in each phase using 3DAP is conducted in the following steps. First, a sample is cut into a thin piece by dicing. A needle-like sample for a pickup atom probe (AP) is prepared from the thin piece by FIB.

The measurement using 3DAP is applied to the inner portion of the sintered body. The inner portion of the sintered body is measured as follows. First, in the central portion of the longest side on a surface having the maximum area, the composition is measured with respect to the surface portion and the inner portion of a cross-sectional surface obtained by cutting the sintered body perpendicularly to the side (in a case of a curve, perpendicularly to the tangent line of the central portion). The measurement points are defined as follows. A first reference line is drawn from the position located at ½ of each side on the cross-sectional surface as the start point to the end portion toward the inner side perpendicularly to the side. A second reference line is drawn from the center of each corner portion as the start point to the end portion toward the inner side at the position of ½ of the angle of the inner angle of the corner portion. Each position from the start points of the first and second reference lines to the positions of 1% of the lengths of the reference lines is defined as the surface portion. Each position from the start points of the first and second reference lines to the positions of 40% of the lengths of the reference lines is defined as the inner portion. When a corner portion has a curvature because of chamfering, etc., the intersection of extended adjacent sides is set as the end portion of the sides (in other words, the center of the corner portion). In this case, the measurement point is not a position from the intersection, and is a position from the portion which is in contact with the reference line.

When the measurement points are defined as described above, and the cross-sectional surface is rectangular, the number of first reference lines is four, and the number of second reference lines is four. Thus, the total number of reference lines is eight. The number of measurement points is eight in each of the surface portion and the inner portion. In the present embodiment, all of the eight points preferably satisfy the above composition ranges in each of the surface portion and the inner portion. However, at least four points should satisfy the above composition ranges in each of the surface portion and the inner portion. In this case, the composition ranges do not define the relationship between the surface portion and the inner portion with a single reference line. Observation is conducted after the observation surface inside the sintered body defined as above is smoothed by polishing. For example, arbitrary twenty points in each phase are set as the observation points in TEM-EDX for the measurement of concentration. The mean value of measurement values excluding the maximum and minimum values from all the measurement values in each point is obtained and set as the concentration of each element. The measurement using 3DAP also follows the same rules.

In the result of measurement of concentration in the Cu-rich phase using 3DAP as explained above, the concentration profile of Cu in the Cu-rich phase is preferably sharp. Specifically, the full width at half maximum (FWHM) of the concentration profile of Cu is preferably less than or equal to 5 nm. In this case, a higher coercivity can be obtained. When the distribution of Cu in the Cu-rich phase is sharp, the difference in domain wall energy between the cell phase and the Cu-rich phase is rapidly produced. Thus, the domain wall more easily undergoes pinning.

The FWHM of the concentration profile of Cu in the Cu-rich phase is obtained as follows. The value in which the concentration of Cu is the highest (PCu) is obtained from the Cu profile of 3DAP based on the above method. The width of the peak in which the value is half PCu (PCu/2), in other words, the FWHM, is obtained. This measurement is applied to ten peaks. The mean value of the measurement values is defined as the FWHM of the Cu profile. When the FWHM of the Cu profile is less than or equal to 3 nm, the effect of improving the coercivity is increased. When the FWHM of the Cu profile is less than or equal to 2 nm, the coercivity is further improved.

The squareness ratio is defined as follows. First, the DC magnetization is measured at ambient temperature by a DC B-H tracer. Subsequently, the basic properties of the magnet, specifically, the remnant magnetization Mr, the coercivity Hcj and the maximum energy product (BH)max, are calculated by the B-H curve obtained from the result of measurement. At this time, the theoretical maximum value (BH)max is obtained by the following equation, using Mr:

$$(BH)\max(\text{theoretical value})=Mr^2/4\mu0 \quad (1)$$

The squareness ratio is evaluated by the ratio between (BH)max obtained by measurement and (BH)max (theoretical value), and is given by:

$$(BH)\max(\text{actual measurement value})/(BH)\max(\text{theoretical value})\times 100 \quad (2)$$

Now, an example of a method for manufacturing the permanent magnet is explained. First, alloy powders containing predetermined elements necessary for the composition of the permanent magnet are prepared. Subsequently, the alloy powders are filled in a metal mold provided in an electromagnet. Compression is applied with a magnetic field. In this manner, a green compact in which the crystal axis is oriented is prepared.

For example, alloy powers can be prepared by crushing an alloy ingot obtained by casting molten metal obtained by arc melting or high-frequency melting. A plurality of powders having different compositions may be mixed to obtain alloy powders having a desired composition. Alloy powders may be prepared, using a mechanical alloying method, a mechanical grinding method, a gas atomizing method, a reduction and diffusion method, etc. In a strip casting method, thin alloy powders having a flake shape are prepared. Subsequently, the alloy strips are pulverized into alloy powders. For example, molten alloy is poured into a cooling roll which rotates at a peripheral speed greater than or equal to 0.1 m/s and less than or equal to 20 m/s. In this manner, it is possible to prepare a thin strip which is continuously solidified into a thickness less than or equal to 1 mm. When the peripheral speed is less than 0.1 m/s, the composition easily varies in the thin strip. When the peripheral speed is greater than 20 m/s, for example, the crystalline grains are excessively fine. Thus, the magnetic properties may be degraded. The peripheral speed of the cooling roll is greater than or equal to 0.3 m/s and less than or equal to 15 m/s, more preferably greater than or equal to 0.5 m/s and less than or equal to 12 m/s.

Further, when a thermal treatment is applied to the material of the alloy powders or the alloy before pulverization, the material can be homogenized. For example, the material can be ground, using a jet mill, a ball mill, etc. The oxidation of the powders can be prevented by grinding the material in inert gas atmosphere or in an organic solvent.

When the average grain diameter of the powders after pulverization is greater than or equal to 2 μm and less than or equal to 5 μm, and further when the powders having a grain diameter greater than or equal to 2 μm and less than or equal to 10 μm account for 80% or more of all the powders, the degree of orientation is high, and the coercivity is great. To realize this structure, a jet mill is preferably used for grinding.

When a ball mill is used for grinding, a large amount of fine powders having a submicron grain diameter is contained even if the average grain diameter of the powders is greater than or equal to 2 μm and less than or equal to 5 μm. When the fine powders are agglomerated, the c-axis of crystals in the $TbCu_7$ phase is difficult to align in the direction of the axis of easy magnetization in the magnetic field orientation at the time of compression. Thus, the degree of orientation is easily degraded. The fine powders may increase the amount of oxide in the sintered body and decrease the coercivity. In particular, when the concentration of Fe is greater than or equal to 25 at %, the powders having a grain diameter greater than or equal to 10 μm preferably account for 10% or less of all the powders after pulverization. When the concentration of Fe is greater than or equal to 25 at %, the amount of different phases in the ingot as the raw material is increased. In the different phases, the amount of powders is increased. In addition, the grain diameter tends to be increased, and may be greater than or equal to 20 μm.

When such an ingot is crushed, for example, powders having a grain diameter greater than or equal to 15 μm may become powders of different phases as they are. When pulverized powders including the coarse powders of different phases are compressed in a magnetic field to obtain a sintered body, different phases may remain. Thus, the reduction in coercivity, magnetization, squareness ratio, etc., is caused. When the squareness ratio is decreased, magnetizing is difficult. In particular, it is difficult to apply magnetizing to the rotor, etc., after assembly. When powders having a grain diameter greater than or equal to 10 μm account for 10% or less of all the powders, it is possible to increase the coercivity while preventing the reduction in the squareness ratio in a composition having a high concentration of Fe containing 25 at % or more Fe.

According to the present embodiment, in the method for manufacturing the permanent magnet, an oxidation treatment is applied to the powder compact obtained by compression. By applying an oxidation treatment, oxygen molecules can be adsorbed to the surface of the powder compact before sintering. If an oxidation treatment is applied to the final product, the effect is small. In the final product, only the surface of the sample is oxidized. The thickness of the phase containing the oxide of R must be 50 μm or greater. To obtain this thickness, an oxidation treatment is required before sintering. However, if the powder compact is oxidized more than necessity, the entire magnet is oxidized. Thus, detrimental effects are caused, such as the reduction in magnetization and coercivity.

According to the present embodiment, in the method for manufacturing the permanent magnet, an oxidation treatment is performed by leaving the powder compact at a temperature greater than or equal to 15° C. and less than or equal to 35° C., for a time greater than or equal to 2 hours and less than 24 hours, in an atmosphere having a humidity greater than or equal to 20% and less than or equal to 50%.

Oxygen molecules are not sufficiently adsorbed to the sintered body when an oxidation treatment is performed, provided that at least one of the following conditions is met: humidity less than or equal to 20%; temperature less than or equal to 15° C.; time less than 2 hours; and atmosphere of inert gas. At this time, the thickness of the phase containing the oxide of R is less than or equal to 50 μm, and the recoil permeability is less than 1.1. Further, oxygen molecules are excessively adsorbed to the sintered body when an oxidation treatment is performed, provided that at least one of the following conditions is met: humidity greater than or equal to 50%; temperature greater than or equal to 35° C.; and time greater than 24 hours. At this time, the thickness of the phase containing the oxide of R exceeds 800 μm, and the reduction in magnetization and coercivity is remarkable. In an oxidation treatment, the humidity is more preferably greater than or equal to 23% and less than or equal to 45%. The temperature is more preferably greater than or equal to 20° C. and less than or equal to 30° C. The time is more preferably greater than or equal to 6 hours and less than 12 hours.

Subsequently, sintering is performed. In sintering, a thermal treatment is applied to the green compact by retaining it at a temperature greater than or equal to 1180° C. and less than or equal to 1220° C. for a time greater than or equal to 1 hour and less than or equal to 15 hours. For example, when the retention temperature is less than 1180° C., the density of the resulting sintered body tends to be low. When the retention temperature is greater than 1220° C., the magnetic properties may be degraded as the R elements in the powders such as Sm are excessively evaporated, etc. The retention temperature is more preferably greater than or equal to 1190° C. and less than or equal to 1210° C. When the retention time is less than 1 hour, the magnetization tends to be reduced since the density easily gets nonuniform. Further, the grain diameter of the sintered body is small, and the ratio of the grain boundary phase is high. In this manner, the magnetization is easily decreased.

When a thermal treatment is applied for more than 15 hours, the R elements in the powders are excessively evaporated. Thus, the magnetic properties may be degraded. More preferably, the retention time is greater than or equal to 2 hours and less than or equal to 13 hours. Further preferably, the retention time is greater than or equal to 3 hours and less than or equal to 10 hours. The oxidation can be prevented by applying a thermal treatment in vacuum or gaseous argon. The density of the sintered body can be improved by maintaining the vacuum until a temperature close to the retention temperature is reached, for example, until a temperature greater than or equal to 1100° C. and less than or equal to 1200° C. is reached, subsequently switching the vacuum to an Ar atmosphere and applying isothermal holding.

According to the present embodiment, in the method for manufacturing the permanent magnet, a phase containing an oxide of R with a thickness greater than or equal to 50 μm can be formed by applying sintering to the powder compact to which oxygen molecules are adsorbed by an oxidation treatment. In a conventional method, after a powder compact is formed, sintering is performed as soon as possible, or the powder compact is kept in an inert gas atmosphere. In the permanent magnet of the present embodiment, a phase containing an oxide of R is formed by applying sintering to the powder compact to which oxygen molecules are adsorbed by an oxidation treatment.

In the above manufacturing method, a phase containing an oxide of R can be formed with a necessary range in the surface portion in comparison with the central portion. The thickness of the phase containing the oxide of R can be made greater than or equal to 50 μm and less than or equal to 800 μm.

Subsequently, a process for improving the quality is performed. In this process, a thermal treatment is performed by retaining the sintered body at a temperature which is less than the thermal treatment temperature at the time of sintering by 10° C. or more, and greater than the thermal treatment temperature at the time of the solution heat treatment by 10° C. or more, for a time greater than or equal to 2 hours and less than or equal to 12 hours. When the temperature is not less than the thermal treatment temperature at the time of sintering by 10° C. or more in this thermal treatment, a different phase produced from a liquid phase during sintering cannot be sufficiently removed. In many cases, the degree of orientation of the different phase is low. When such a different phase is present, the crystal orientation of crystal grains is easily out of alignment relative to the axis of easy magnetization. The squareness ratio is reduced, and further, the magnetization is easily decreased. In a solution heat treatment, the temperature is low. Thus, it is difficult to sufficiently remove a different phase produced during sintering in terms of the speed of element diffusion. In addition, the grain growth is slow. There is a possibility that a sufficient grain diameter cannot be obtained. Thus, the improvement of squareness ratio cannot be expected. By contrast, it is possible to sufficiently remove the above different phase and make the crystal grains included in the main phase large by applying a process for improving the quality at a temperature greater than the retention temperature at the time of the solution heat treatment by 10° C. or more.

In a process for improving the quality, the retention temperature is preferably, for example, greater than or equal to 1130° C. and less than or equal to 1190° C. When the temperature is less than 1130° C. or exceeds 1190° C., the squareness ratio may be decreased. When the thermal treatment time is less than 2 hours, the diffusion is insufficient, and thus, different phases cannot be sufficiently removed. Thus, the effect of improving the squareness ratio is small. When the thermal treatment time exceeds 12 hours, excellent magnetic properties may not be obtained since R elements such as Sm are evaporated. In a process for improving the quality, the thermal treatment time is more preferably greater than or equal to 4 hours and less than or equal to 10 hours, and further preferably greater than or equal to 6 hours and less than or equal to 8 hours. This process is preferably performed in vacuum or in an inert atmosphere of gaseous argon, etc., to prevent oxidation.

The prevention of a different phase being produced is improved by setting the pressure inside the chamber to a positive pressure in a process for improving the quality. In this manner, excessive evaporation of R elements can be prevented, and thus, the reduction in coercivity can be prevented. For example, the pressure inside the chamber is preferably greater than or equal to 0.15 MPa and less than or equal to 15 MPa, more preferably greater than or equal to 0.2 MPa and less than or equal to 10 MPa, and further preferably greater than or equal to 1.0 MPa and less than or equal to 5.0 MPa.

Subsequently, a solution heat treatment is performed. In a solution heat treatment, a TbCu7 crystalline phase (1-7 crystalline phase), which is the precursor to a phase separation composition, is formed. In this process, a thermal treatment is applied at a temperature greater than or equal to 1090° C. and less than 1170° C. for a time greater than or equal to 3 hours and less than or equal to 28 hours.

When the retention temperature in the solution heat treatment is less than 1090° C. or greater than or equal to 1170° C., the percentage of the TbCu7 crystal phase present in the sample after the solution heat treatment is small. Thus, the magnetic properties may be degraded. The retention temperature is preferably greater than or equal to 1100° C. and less than or equal to 1165° C. When the retention time in the solution heat treatment is less than 3 hours, the constituent phases tend to be nonuniform. Further, the coercivity is easily reduced, and the grain diameter of the metal structure tends to be small. The ratio of the grain boundary phase tends to be high. The magnetization is easily decreased. When the retention time in the solution heat treatment exceeds 28 hours, the magnetic properties may be degraded as the R elements in the sintered body are evaporated, etc. The retention time is preferably greater than or equal to 4 hours and less than or equal to 24 hours, and more preferably greater than or equal to 10 hours and less than or equal to 18 hours. The oxidation of powders can be prevented by applying a solution heat treatment in vacuum or in an inert atmosphere of gaseous argon, etc.

An aging treatment is applied to the sintered body after rapid cooling. An aging treatment is performed to increase the coercivity of the magnet by controlling the metal structure. This treatment aims to separate the metal structure of the magnet into a plurality of phases.

In an aging treatment, the temperature is increased to a temperature greater than or equal to 760° C. and less than or equal to 850° C. At the reached temperature, the sintered body is retained for a time greater than or equal to 20 hours and less than or equal to 60 hours (first retention). Subsequently, slow cooling is applied at a cooling speed greater than or equal to 0.2° C./m and less than or equal to 2.0° C./m until a temperature greater than or equal to 350° C. and less than or equal to 650° C. is reached. At the reached temperature, the sintered body is retained for a time greater than or equal to 30 minutes and less than or equal to 8 hours (second retention). In this manner, a thermal treatment is applied. Subsequently, the sintered body is cooled to an ambient temperature. In this way, a sintered magnet can be obtained.

When the retention temperature is greater than 850° C. in the first retention, the cell phase is coarse, and the squareness ratio is easily decreased. When the retention temperature is less than 760° C., the cell structure cannot be sufficiently obtained, and thus, the coercivity is hardly exhibited. In the first retention, the retention temperature is more preferably, for example, greater than or equal to 780° C. and less than or equal to 840° C. When the retention time is less than 20 hours in the first retention, the cell structure is insufficient, and thus, the coercivity is hardly exhibited. When the retention time is greater than 60 hours, the cell-wall phase is excessively thick, and thus, the squareness ratio may be decreased. In the first retention, the retention time is more preferably, for example, greater than or equal to 25 hours and less than or equal to 40 hours.

When the cooling speed in slow cooling is less than 0.2° C./m, the cell-wall phase is excessively thick, and thus, the magnetization is easily decreased. When the cooling speed exceeds 2.0° C./m, the difference in the concentration of Cu between the cell phase and the cell-wall phase is insufficient, and thus, the coercivity is easily reduced. In slow cooling, the cooling speed is, for example, preferably greater than or equal to 0.4° C./m and less than or equal to 1.5° C./m, and more preferably greater than or equal to 0.5° C./m and less than or equal to 1.3° C./m. When the sintered body is slowly cooled to a temperature less than 350° C., the above different phase having a low temperature is easily produced. When the sintered body is slowly cooled to a temperature exceeding 650° C., the concentration of Cu in the Cu-rich phase is not sufficiently increased. Thus, the coercivity may be insufficient. When the retention time exceeds 8 hours in the second retention, a different phase having a low temperature is produced, and thus, the magnetic properties may be too poor.

In an aging treatment, the sintered body may be retained at a predetermined temperature for a certain time when slow cooling is applied. Subsequently, slow cooling may be further applied. The above aging treatment may be applied as a main aging treatment. Before the main aging treatment, a preliminary aging treatment may be performed by retaining the sintered body at a temperature less than the retention temperature of the first retention for a time less than the retention time of the first retention. The squareness ratio can be improved by the retention in the above slow cooling and the preliminary aging treatment.

The permanent magnet having the above structure can be used for rotary electrical machines including various types of motors and generators. The permanent magnet can be also used as a stationary magnet or variable magnet for variable flux motors. In particular, the permanent magnet rotary electrical machine of the present embodiment may be applied to a variable flux motor, and the motor may be incorporated in a vehicle such as a hybrid automobile. The technique disclosed in, for example, JP 2008-29148 A and JP 2008-43172 A may be applied to the structure of the variable flux motor or the drive system.

FIG. 8 is a block diagram showing the configuration of the drive train of a hybrid automobile as a vehicle in which the rotary electrical machine system of the present embodiment is employed. In FIG. 8, an engine 102 is mounted in an automobile 100. The engine 102 is configured to drive an axle 106 provided in a rear wheel 105 (which may be a front wheel, or both of them) via a transmission 103 and a differential gear 104.

A permanent magnet synchronous motor 107 which is the rotary electrical machine of the present embodiment is provided in the automobile 100 in addition to the engine 102. The axis of rotor rotation of the motor 107 is directly coupled to or is couple to the drive shaft of the engine 102. In this manner, the motor 107 and the engine 102 are allowed to be used selectively or in combination to control the rotation of the drive shaft (the axis of rotation).

The motor 107 is connected to a battery 10B via a drive unit 10A. The drive unit 10A includes an inverter 108 and a control device 109. The inverter 108 switches the output of the battery 10B. The control device 109 controls the switching of the inverter 108 in accordance with the target rate of rotation.

The motor 107 is the rotary electrical machine of the present embodiment. Therefore, the material of the permanent magnet has a high recoil permeability in comparison with that of a normal high-efficiency permanent magnet. A variable speed operation can be performed in a wide range from low to high speed. In this way, high efficiency can be realized in the entire range of operation from low to high speed. The load on the power element of the inverter 108 can be reduced. In particular, the current amount in field-weakening control can be dramatically decreased. Thus, the power consumed by the battery can be reduced. It is possible to realize a drive train which is further highly efficient.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

EXAMPLES

Examples of the permanent magnet having the above properties are specifically explained.

Examples 1 and 2

After the raw materials used for each permanent magnet were weighed and mixed in a predetermined ratio, arc melting was applied in an atmosphere of gaseous Ar. In this manner, an alloy ingot was prepared. A thermal treatment was applied, retaining the above alloy ingot at 1160° C. for 19 hours. Subsequently, the alloy ingot underwent a coarse crushing step and a grinding step using a jet mill. Thus, alloy powders were prepared as the powders of the raw materials of each magnet. The obtained alloy powders were compressed in a magnetic field. In this way, a compressive compact was prepared.

Subsequently, as shown in Table 2, an oxidation treatment was performed by leaving the compressive compact at a humidity of 30% and a temperature of 23° C. for 2.5 hours. Further, the compressive compact of the alloy powders was provided in a sintering furnace chamber. The chamber was made vacuum. Subsequently, the temperature was increased to 1175° C. At the reached temperature, the compact was retained for 30 minutes. Subsequently, gaseous Ar was introduced. The temperature was increased to 1200° C. in an Ar atmosphere. At the reached temperature, the compact was retained for 6 hours. In this way, sintering was applied. Subsequently, a process for improving the quality was performed by setting the pressure inside the chamber to 0.5 MPa and retaining the sintered body at 1185° C. for 3 hours. Subsequently, slow cooling was applied at a cooling speed of 5.0° C./m until 1170° C. was reached. At the reached temperature, the sintered body was retained for 12 hours. Thus, a solution heat treatment was applied. Subsequently, the sintered body was cooled to an ambient temperature. The cooling speed after the solution heat treatment was 180° C./m.

The temperature of the sintered body after the solution heat treatment was increased to 750° C. At the reached temperature, the sintered body was retained for 1 hour. Subsequently, slow cooling was applied at a cooling speed of 1.5° C./m until 350° C. was reached. Subsequently, as an aging treatment, the temperature was increased to 835° C., and the sintered body was retained at the reached temperature for 35 hours. Subsequently, slow cooling was applied at a cooling speed of 1.0° C./m until 400° C. was reached. At the reached temperature, the sintered body was retained for 1 hour. Subsequently, the sintered body underwent furnace cooling until an ambient temperature was reached. In this way, each magnet was obtained.

Chemical composition analysis was applied to each magnet by an inductively coupled plasma (ICP) method. The composition analysis was performed with the ICP method in the following steps. First, specimen was taken from the above measurement point and crushed in a mortar. A certain amount of crushed specimens was measured off and put into a beaker formed of quartz. Further, mixed acid (including nitric acid and hydrochloric acid) was put into the beaker. The specimens in the beaker were heated to approximately 140° C. on a hot plate and completely solved. After the solution was naturally cooled, it was transferred to a PFA measuring flask such that the volume was constant. In this way, a sample solution was prepared.

The amounts of the contained components of the sample solution were analyzed by a calibration curve method, using an ICP emission spectrophotometer. As the ICP emission spectrophotometer, SPS4000 made by SII NanoTechnology Inc., was used. The compositions of the obtained magnets are shown in Table 1. The concentration of oxygen in the central portion $O_{center}$, the concentration of oxygen in the surface portion $O_{surface}$, the thickness of the phase containing the oxide of R, the recoil permeability, the coercivity Hcj and the remnant magnetization were measured. The results are shown in Table 3. In the examples and the comparative examples, HD2300 made by Hitachi High-Technologies Corporation., was used as the measurement device.

Examples 3, 4 and 5

After the raw materials were weighed and mixed in a predetermined ratio, high-frequency dissolution was applied in an atmosphere of gaseous Ar. In this manner, an alloy ingot was prepared. Coarse crushing was applied to the alloy ingot. Subsequently, a thermal treatment was applied at 1160° C. for 2 hours. The alloy ingot was rapidly cooled to an ambient temperature. Further, the alloy ingot underwent a coarse crushing step and a grinding step using a jet mill. Thus, alloy powders were prepared as the powders of the raw materials of each magnet. The obtained alloy powders were compressed in a magnetic field. In this way, a compressive compact was prepared.

Subsequently, as shown in Table 2, an oxidation treatment was performed by leaving the compressive compact at a humidity of 36% and a temperature of 18° C. for 20 hours. Further, the compressive compact of the alloy powders was provided in a sintering furnace chamber. The chamber was made vacuum at $8.8\times10^{-3}$ Pa. Subsequently, the temperature was increased to 1175° C. At the reached temperature, the compact was retained for 60 minutes. Subsequently, gaseous Ar was introduced into the chamber. The temperature inside the chamber was increased to 1195° C. in an Ar atmosphere. At the reached temperature, the compact was retained for 5 hours. In this way, sintering was applied. Subsequently, a process for improving the quality was performed by setting the pressure inside the chamber to 0.2 MPa and retaining the sintered body at 1160° C. for 2 hours. Subsequently, slow cooling was applied at a cooling speed of 5.0° C./m until 1130° C. was reached. At the reached temperature, the sintered body was retained for 20 hours. Thus, a solution heat treatment was applied. Subsequently, the sintered body was cooled to an ambient temperature. The cooling speed after the solution heat treatment was 150° C./m.

Subsequently, the temperature of the sintered body after the solution heat treatment was increased to 700° C. At the reached temperature, the sintered body was retained for 30 minutes. Subsequently, as an aging treatment, the temperature was increased to 850° C., and the sintered body was retained for 50 hours at the reached temperature. Subsequently, slow cooling was applied at a cooling speed of 0.75° C./m until 450° C. was reached. At the reached temperature, the sintered body was retained for 4 hours. Subsequently, slow cooling was applied at a cooling speed of 0.5° C./m until 380° C. was reached. At the reached temperature, the sintered body was retained for 1 hour. Subsequently, the sintered body underwent furnace cooling until an ambient temperature was reached. In this way, each magnet was obtained.

The amounts of the contained components of the sample solution were analyzed by a calibration curve method, using the above ICP emission spectrophotometer. The compositions of the obtained magnets are shown in Table 1. In a manner similar to that of the other examples, the concentration of oxygen in the central portion $O_{center}$, the concentration of oxygen in the surface portion $O_{surface}$, the thickness of the phase containing the oxide of R, the recoil permeability, the coercivity Hcj and the remnant magnetization were measured. The results are shown in Table 3.

Examples 6 and 7

After the raw materials were weighed and mixed in a predetermined ratio, high-frequency dissolution was applied in an atmosphere of gaseous Ar. In this manner, an alloy ingot was prepared. Coarse crushing was applied to the alloy ingot. Subsequently, a thermal treatment was applied at 1170° C. for 10 hours. The alloy ingot was rapidly cooled to an ambient temperature. Further, the alloy ingot underwent a coarse crushing step and a grinding step using a jet mill. Thus, alloy powders were prepared as the powders of the raw materials of each magnet. The obtained alloy powders were compressed in a magnetic field. In this way, a compressive compact was prepared.

Subsequently, as shown in Table 2, an oxidation treatment was performed by leaving the compressive compact at a humidity of 24% and a temperature of 28° C. for 12 hours. Further, the compressive compact was provided in a sintering furnace chamber. The chamber was made vacuum at $7.5\times10^{-3}$ Pa. Subsequently, the temperature was increased to 1165° C. At the reached temperature, the compact was retained for 10 hours. Subsequently, gaseous Ar was introduced into the chamber. The temperature inside the chamber was increased to 1185° C. in an Ar atmosphere. At the reached temperature, the compact was retained for 5 hours. In this way, sintering was applied. Subsequently, a process for improving the quality was performed by setting the pressure inside the chamber to 0.7 MPa in an Ar atmosphere and retaining the sintered body at 1160° C. for 10 hours. Subsequently, slow cooling was applied at a cooling speed of 5.0° C./m until 1115° C. was reached. At the reached temperature, the sintered body was retained for 12 hours. Thus, a solution heat treatment was applied. Subsequently, the sintered body was cooled to an ambient temperature. The cooling speed after the solution heat treatment was 220° C./m.

Subsequently, the temperature of the sintered body after the solution heat treatment was increased to 660° C. At the reached temperature, the sintered body was retained for 1 hour. Subsequently, as an aging treatment, the temperature was increased to 840° C., and the sintered body was retained for 50 hours at the reached temperature. Subsequently, slow cooling was applied at a cooling speed of 0.6° C./m until 500° C. was reached. At the reached temperature, the sintered body was retained for 1 hour. Subsequently, slow cooling was applied at a cooling speed of 0.5° C./m until 400° C. was reached. At the reached temperature, the sintered body was retained for 1 hour. Subsequently, the sintered body underwent furnace cooling until an ambient temperature was reached. In this way, each magnet was obtained.

In a manner similar to that of the other examples, the composition of each magnet was confirmed by an ICP method. The compositions of the obtained magnets are shown in Table 1. In a manner similar to that of the other examples, the concentration of oxygen in the central portion $O_{center}$, the concentration of oxygen in the surface portion $O_{surface}$, the thickness of the phase containing the oxide of R, the recoil permeability, the coercivity Hcj and the remnant magnetization were measured. The results are shown in Table 3.

Example 8

After the raw materials were weighed and mixed in a predetermined ratio, high-frequency dissolution was applied in an atmosphere of gaseous Ar. In this manner, an alloy ingot was prepared. Coarse crushing was applied to the alloy ingot. Subsequently, a thermal treatment was applied at 1160° C. for 12 hours. The alloy ingot was rapidly cooled to an ambient temperature. Further, the alloy ingot underwent a coarse crushing step and a grinding step using a jet mill. Thus, alloy powders were prepared as the powders of the raw material of the magnet. The obtained alloy powders were compressed in a magnetic field. In this way, a compressive compact was prepared.

Subsequently, as shown in Table 2, an oxidation treatment was performed by leaving the compressive compact at a humidity of 26% and a temperature of 23° C. for 8 hours. Further, the compressive compact of the alloy powders was provided in a sintering furnace chamber. The chamber was made vacuum at $7.5\times10^{-3}$ Pa. Subsequently, the temperature was increased to 1165° C. At the reached temperature, the compact was retained for 60 minutes. Subsequently, gaseous Ar was introduced into the chamber. The temperature inside the chamber was increased to 1195° C. in an Ar atmosphere. At the reached temperature, the compact was retained for 5 hours. In this way, sintering was applied. Subsequently, a process for improving the quality was performed by setting the pressure inside the chamber to 0.5 MPa in an Ar atmosphere and retaining the sintered body at 1170° C. for 6 hours. Subsequently, slow cooling was applied at a cooling speed of 5.0° C./m until 1140° C. was reached. At the reached temperature, the sintered body was retained for 8 hours. Thus, a solution heat treatment was applied. Subsequently, the sintered body was cooled to an ambient temperature. The cooling speed after the solution heat treatment was 190° C./m.

The temperature of the sintered body after the solution heat treatment was increased to 690° C. At the reached temperature, the sintered body was retained for 2 hours. Subsequently, as an aging treatment, the temperature was increased to 830° C., and the sintered body was retained for 45 hours at the reached temperature. Subsequently, slow cooling was applied at a cooling speed of 0.7° C./m until 600° C. was reached. At the reached temperature, the sintered body was retained for 2 hours. Subsequently, slow cooling was applied at a cooling speed of 0.5° C./m until 400° C. was reached. At the reached temperature, the sintered body was retained for 1 hour. Subsequently, the sintered body underwent furnace cooling until an ambient temperature was reached. In this way, the magnet was obtained.

In a manner similar to that of the other examples, the composition of the magnet was confirmed by an ICP method. The composition of the obtained magnet is shown in Table 1. In a manner similar to that of the other examples, the concentration of oxygen in the central portion $O_{center}$, the concentration of oxygen in the surface portion $O_{surface}$, the thickness of the phase containing the oxide of R, the recoil permeability, the coercivity Hcj and the remnant magnetization were measured. The results are shown in Table 3.

Examples 9 to 14

The alloy powders having the same composition as example 8 were used as the raw materials. By the same method, compression was applied in a magnetic field. In this way, a compressive compact was prepared.

Subsequently, an oxidation treatment was applied. As shown in Table 2, in example 9, an oxidation treatment was performed by leaving the compressive compact at a humidity of 26% and a temperature of 23° C. for 4 hours. In example 10, an oxidation treatment was performed by leaving the compressive compact at a humidity of 26% and a temperature of 23° C. for 22 hours. In example 11, an oxidation treatment was performed by leaving the compressive compact at a humidity of 26% and a temperature of 17° C. for 8 hours. In example 12, an oxidation treatment was performed by leaving the compressive compact at a humidity of 26% and a temperature of 32° C. for 8 hours. In example 13, an oxidation treatment was performed by leaving the compressive compact at a humidity of 22% and a temperature of 23° C. for 8 hours. In example 14, an oxidation treatment was performed by leaving the compressive compact at a humidity of 44% and a temperature of 22° C. for 8 hours.

The compressive compact of the alloy powders was provided in a sintering furnace chamber. The process until sintering was performed on the same conditions as example 8. Subsequently, a process for improving the quality, a solution heat treatment and an aging treatment were applied on the same conditions as example 8. In this way, each magnet was obtained.

In a manner similar to that of the other examples, the composition of each magnet was confirmed by an ICP method. The compositions of the obtained magnets are shown in Table 1. In a manner similar to that of the other examples, the concentration of oxygen in the central portion $O_{center}$, the concentration of oxygen in the surface portion $O_{surface}$, the thickness of the phase containing the oxide of R, the recoil permeability, the coercivity Hcj and the remnant magnetization were measured. The results are shown in Table 3.

Comparative Example 1

A magnet having the composition shown in Table 1 was prepared by the same method as example 1. In a manner similar to that of the example, the concentration of oxygen in the central portion $O_{center}$, the concentration of oxygen in the surface portion $O_{surface}$, the thickness of the area of the oxide, the coercivity Hcj and the remnant magnetization were measured. The results are shown in Table 3. Since the coercivity was less than 1000 kA/m, a knick was formed in the B-H curve. Thus, the recoil permeability could not be measured. The recoil permeability could not be measured in comparative examples 4, 6 and 8 based on the same reason.

Comparative Example 2

A magnet having the composition shown in Table 1 was prepared by the same method as example 4. In a manner similar to that of the example, the concentration of oxygen in the central portion $O_{center}$, the concentration of oxygen in the surface portion $O_{surface}$, the thickness of the phase containing the oxide of R, the recoil permeability, the coercivity Hcj and the remnant magnetization were measured. The results are shown in Table 3.

Comparative Examples 3 to 8

The alloy powders having the same composition as example 8 were used as the raw materials. By the same method, compression was applied in a magnetic field. In this way, a compressive compact was prepared.

Subsequently, an oxidation treatment was applied. As shown in Table 2, in comparative example 3, an oxidation treatment was performed by leaving the compressive compact at a humidity of 26% and a temperature of 23° C. for 30 minutes. In comparative example 4, an oxidation treatment was performed by leaving the compressive compact at a humidity of 26% and a temperature of 23° C. for 36 hours. In comparative example 5, an oxidation treatment was performed by leaving the compressive compact at a humidity of 26% and a temperature of 10° C. for 8 hours. In comparative example 6, an oxidation treatment was performed by leaving the compressive compact at a humidity of 26% and a temperature of 46° C. for 8 hours. In comparative example 7, an oxidation treatment was performed by leaving the compressive compact at a humidity of 15% and a temperature of 23° C. for 8 hours. In comparative example 8, an oxidation treatment was performed by leaving the compressive compact at a humidity of 80% and a temperature of 23° C. for 8 hours.

The compressive compact of the alloy powders was provided in a sintering furnace chamber. The process until sintering was performed on the same conditions as example 8. Subsequently, a process for improving the quality, a solution heat treatment and an aging treatment were applied on the same conditions as example 8. In this way, each magnet was obtained.

In a manner similar to that of the example, the composition of each magnet was confirmed by an ICP method. The compositions of the obtained magnets are shown in Table 1. In a manner similar to that of the other examples, the concentration of oxygen in the central portion $O_{center}$, the concentration of oxygen in the surface portion $O_{surface}$, the thickness of the phase containing the oxide of R, the recoil permeability, the coercivity Hcj and the remnant magnetization were measured. The results are shown in Table 3.

As is clear from tables 1 to 3, the recoil permeability, the coercivity and the magnetization in the permanent magnets of examples 1 to 14 are high in comparison with those in, for example, the permanent magnets of comparative examples 1 and 2. In comparative example 1, the concentration of Sm is high. In comparative example 2, the concentration of Zr is high. The results show that the magnetic properties can be improved by adjusting the amounts of elements constituting each permanent magnet.

The recoil permeability, the coercivity and the magnetization in the permanent magnets of examples 8 to 14 are high in comparison with those in, for example, the permanent magnets of comparative examples 3 and 4. In comparative example 3, the time of oxidation treatment is less than 2 hours. In comparative example 4, the time of oxidation treatment exceeds 24 hours. The results show that the magnetic properties can be improved by performing an oxidation treatment for a predetermined time.

The recoil permeability, the coercivity and the magnetization in the permanent magnets of examples 8 to 14 are high in comparison with those in, for example, the permanent magnets of comparative examples 5 and 6. In comparative example 5, the temperature of oxidation treatment is less than 15° C. In comparative example 6, the temperature of oxidation treatment exceeds 35° C. The results show that the magnetic properties can be improved by performing an oxidation treatment at a predetermined temperature.

The recoil permeability, the coercivity and the magnetization in the permanent magnets of examples 8 to 14 are high in comparison with those in, for example, the permanent magnets of comparative examples 7 and 8. In comparative example 7, the humidity of oxidation treatment is less than 20%. In comparative example 8, the humidity at which the compressive compact is left exceeds 50%. The results show that the magnetic properties can be improved by performing an oxidation treatment at a predetermined humidity.

As described above, the permanent magnets of examples 1 to 14 exhibit a high recoil permeability, a high coercivity and a high magnetization by controlling the concentration of oxygen in the central portion $O_{center}$, the concentration of oxygen in the surface portion $O_{surface}$, and the thickness of the phase containing the oxide of R in the main phase. Thus, the permanent magnets of examples 1 to 14 have excellent magnet properties.

When a field-weakening control method is used in fast rotation in the rotary electrical machine system such as a motor, current by the field-weakening control method is unnecessary. Thus, it is possible to reduce the loss and improve efficiency.

When the rotary electrical machine system is used for a vehicle such as an automobile, it is possible to prevent reduction in output and improve efficiency.

TABLE 1

| | Composition of magnet (atomic ratio) (Others; Example 1: Nd, 2: Ti, 3: Mn, 4: Cr, 5: Al_0.0115 + Cr_0.015, Comparative Example 1: Cr, 2: Ti) | | | | | |
|---|---|---|---|---|---|---|
| | Sm | Co | Fe | Cu | Zr | Others |
| Example 1 | 10.80 | 53.62 | 26.59 | 5.32 | 3.10 | 0.57 |
| Example 2 | 12.27 | 51.73 | 27.20 | 5.44 | 1.61 | 1.75 |
| Example 3 | 10.81 | 53.00 | 29.61 | 4.91 | 1.45 | 0.22 |
| Example 4 | 11.26 | 52.99 | 29.82 | 4.13 | 1.64 | 0.16 |
| Example 5 | 11.14 | 47.72 | 29.59 | 9.95 | 1.51 | 0.09 |
| Example 6 | 11.24 | 49.79 | 32.13 | 5.24 | 1.60 | 0.00 |
| Example 7 | 11.40 | 47.93 | 33.84 | 5.32 | 1.51 | 0.00 |
| Example 8 | 11.36 | 50.76 | 30.85 | 5.41 | 1.62 | 0.00 |
| Example 9 | 11.36 | 50.76 | 30.85 | 5.41 | 1.62 | 0.00 |
| Example 10 | 11.36 | 50.76 | 30.85 | 5.41 | 1.62 | 0.00 |
| Example 11 | 11.36 | 50.76 | 30.85 | 5.41 | 1.62 | 0.00 |
| Example 12 | 11.36 | 50.76 | 30.85 | 5.41 | 1.62 | 0.00 |

TABLE 1-continued

| | Composition of magnet (atomic ratio) (Others; Example 1: Nd, 2: Ti, 3: Mn, 4: Cr, 5: Al_0.0115 + Cr_0.015, Comparative Example 1: Cr, 2: Ti) | | | | | |
|---|---|---|---|---|---|---|
| | Sm | Co | Fe | Cu | Zr | Others |
| Example 13 | 11.36 | 50.76 | 30.85 | 5.41 | 1.62 | 0.00 |
| Example 14 | 11.36 | 50.76 | 30.85 | 5.41 | 1.62 | 0.00 |
| Comparative Example 1 | 12.73 | 52.68 | 26.10 | 5.18 | 3.05 | 0.26 |
| Comparative Example 2 | 11.26 | 51.08 | 29.82 | 4.13 | 3.55 | 0.16 |
| Comparative Example 3 | 11.36 | 50.76 | 30.85 | 5.41 | 1.62 | 0.00 |
| Comparative Example 4 | 11.36 | 50.76 | 30.85 | 5.41 | 1.62 | 0.00 |
| Comparative Example 5 | 11.36 | 50.76 | 30.85 | 5.41 | 1.62 | 0.00 |
| Comparative Example 6 | 11.36 | 50.76 | 30.85 | 5.41 | 1.62 | 0.00 |
| Comparative Example 7 | 11.36 | 50.76 | 30.85 | 5.41 | 1.62 | 0.00 |
| Comparative Example 8 | 11.36 | 50.76 | 30.85 | 5.41 | 1.62 | 0.00 |

TABLE 2

| | Thermal treatment time (hr) | Thermal treatment temperature (° C.) | Thermal treatment humidity (%) |
|---|---|---|---|
| Example 1 | 2.5 | 23 | 30 |
| Example 2 | 2.5 | 23 | 30 |
| Example 3 | 20 | 18 | 36 |
| Example 4 | 20 | 18 | 36 |
| Example 5 | 20 | 18 | 36 |
| Example 6 | 12 | 28 | 24 |
| Example 7 | 12 | 28 | 24 |
| Example 8 | 8 | 23 | 26 |
| Example 9 | 4 | 23 | 26 |
| Example 10 | 22 | 23 | 26 |
| Example 11 | 8 | 17 | 26 |
| Example 12 | 8 | 32 | 26 |
| Example 13 | 8 | 23 | 22 |
| Example 14 | 8 | 23 | 44 |
| Comparative Example 1 | 2.5 | 23 | 30 |
| Comparative Example 2 | 20 | 18 | 36 |

TABLE 2-continued

| | Thermal treatment time (hr) | Thermal treatment temperature (° C.) | Thermal treatment humidity (%) |
|---|---|---|---|
| Comparative Example 3 | 0.5 | 23 | 26 |
| Comparative Example 4 | 36 | 23 | 26 |
| Comparative Example 5 | 8 | 10 | 26 |
| Comparative Example 6 | 8 | 46 | 26 |
| Comparative Example 7 | 8 | 23 | 15 |
| Comparative Example 8 | 8 | 23 | 80 |

TABLE 3

| | $O_{center}$ [at %] | $O_{surface}$ [at %] | $O_{surface}/O_{center}$ | Thickness of phase containing oxide of R [μm] | Coercivity Hcj (kA/m) | Remnant magnetization Br (T) | Recoil permeability |
|---|---|---|---|---|---|---|---|
| Example 1 | 5.1 | 11.6 | 2.3 | 58 | 1760 | 1.17 | 1.21 |
| Example 2 | 5.4 | 13.1 | 2.4 | 55 | 1690 | 1.18 | 1.22 |
| Example 3 | 6.7 | 36.3 | 5.4 | 169 | 1470 | 1.20 | 1.52 |
| Example 4 | 6.4 | 40.2 | 6.3 | 205 | 1510 | 1.21 | 1.55 |
| Example 5 | 7.3 | 39.8 | 5.5 | 177 | 1500 | 1.22 | 1.43 |
| Example 6 | 6.0 | 28.4 | 4.7 | 128 | 1480 | 1.23 | 1.35 |
| Example 7 | 6.5 | 27.5 | 4.2 | 111 | 1300 | 1.25 | 1.28 |
| Example 8 | 5.7 | 20.2 | 3.5 | 84 | 1510 | 1.23 | 1.29 |
| Example 9 | 5.0 | 11.4 | 2.3 | 62 | 1550 | 1.24 | 1.22 |
| Example 10 | 6.5 | 25.6 | 3.9 | 103 | 1430 | 1.22 | 1.49 |
| Example 11 | 5.1 | 12.5 | 2.5 | 68 | 1590 | 1.24 | 1.24 |
| Example 12 | 5.4 | 23.5 | 4.4 | 110 | 1380 | 1.22 | 1.5 |
| Example 13 | 5.1 | 12.6 | 2.5 | 65 | 1235 | 1.23 | 1.27 |
| Example 14 | 5.9 | 25.1 | 4.3 | 105 | 1490 | 1.23 | 1.44 |
| Comparative Example 1 | 5.0 | 11.0 | 2.2 | 55 | 220 | 1.10 | — |
| Comparative Example 2 | 6.5 | 13.5 | 2.1 | 58 | 360 | 1.13 | — |
| Comparative Example 3 | 5.4 | 8.2 | 1.5 | 33 | 1600 | 1.24 | 1.11 |
| Comparative Example 4 | 6.1 | 50.5 | 8.3 | 955 | 660 | 1.19 | — |
| Comparative Example 5 | 5.2 | 9.8 | 1.9 | 46 | 1580 | 1.24 | 1.12 |
| Comparative Example 6 | 7.6 | 51.2 | 6.7 | 863 | 720 | 1.14 | — |
| Comparative Example 7 | 5.3 | 10.0 | 1.9 | 40 | 1600 | 1.24 | 1.1 |
| Comparative Example 8 | 8.1 | 48.5 | 6.0 | 811 | 550 | 1.11 | — |

What is claimed is:

1. A rotary electrical machine system comprising:

a permanent-magnet rotary electrical machine which forms a magnetic pole of a rotor with a permanent magnet;

an inverter which produces an AC voltage by switching and outputs the AC voltage to the rotary electrical machine as drive power; and a controller which detects a field-component current in the rotary electrical machine, estimates a rate of rotation of the rotor of the rotary electrical machine based on the detected current, obtains a field-component voltage in the rotary electrical machine based on a difference between the estimated rate of rotation of the rotor and a target rate of rotation, and controls the switching of the inverter based on the field-component voltage such that the rate of rotation of the rotor follows the target rate of rotation, wherein the permanent magnet is an R—Co permanent magnet containing 25 to 40 at % iron, where R is at least one element selected from rare-earth elements, wherein the permanent magnet comprises a main phase having a 2-17 crystalline phase and a grain boundary phase provided between crystalline grains constituting the main phase, a concentration of element R in the grain boundary phase is higher than a concentration of element R in the main phase, and a content of samarium in element R is not less than 50 atomic percent (at %), wherein the permanent magnet has a remnant magnetization greater than or equal to 1.16 T, a coercivity Hcj on an M-H curve greater than or equal to 1000 kA/m, and a recoil permeability on a B-H curve greater than or equal to 1.1, and wherein the controller performs field-weakening control by increasing and decreasing the field-component voltage based on a negative-field-component current in accordance with the rate of rotation of the rotor by a material of the permanent magnet.

2. The system of claim 1, wherein the permanent magnet comprises a composition containing iron, copper, cobalt, at least one element R selected from rare-earth elements, and at least one element M selected from zirconium, titanium and hafnium, and in the composition, an amount of the element R is 10.8 to 12.5 atomic percent (at %), an amount of the element M is 0.88 to 3.5 at %, and an amount of the copper is 3.5 to 13.5 at %.

3. The system of claim 1, wherein the permanent magnet has a coercivity Hcb on the B-H curve less than or equal to 800 kA/m, and a ratio of a magnetic field Hk90 when the magnetization is 90% of the remnant magnetization to the coercivity Hcj is less than or equal to 70.

4. The system of claim 1, wherein the magnetic pole of the rotor of the rotary electrical machine is formed by providing a permanent magnet having a recoil permeability different from the recoil permeability of the permanent magnet in series and/or in parallel on a magnetic circuit.

5. The system of claim 1, wherein the content of samarium in element R is not less than 70 at %.

6. The system of claim 1, wherein the content of samarium in element R is not less than 90 at %.

7. A drive unit for a rotary electrical machine, the drive unit driving a permanent-magnet rotary electrical machine which forms a magnetic pole of a rotor with a permanent magnet, the drive unit comprising:

an inverter which produces an AC voltage by switching and outputs the AC voltage to the rotary electrical machine as drive power; and a controller which detects a field-component current in the rotary electrical machine, estimates a rate of rotation of the rotor of the rotary electrical machine based on the detected current, obtains a field-component voltage in the rotary electrical machine based on a difference between the estimated rate of rotation of the rotor and a target rate of rotation, and controls the switching of the inverter based on the field-component voltage such that the rate of rotation of the rotor follows the target rate of rotation, wherein the permanent magnet is an R—Co permanent magnet containing 25 to 40 at % iron, where R is at least one element selected from rare-earth elements, wherein the permanent magnet comprises a main phase having a 2-17 crystalline phase and a grain boundary phase provided between crystalline grains constituting the main phase, a concentration of element R in the grain boundary phase is higher than a concentration of element R in the main phase, and a content of samarium in element R is not less than 50 atomic percent (at %) at %, wherein the permanent magnet has a remnant magnetization greater than or equal to 1.16 T, a coercivity Hcj on an M-H curve greater than or equal to 1000 kA/m, and a recoil permeability on a B-H curve greater than or equal to 1.1, and wherein the controller performs field-weakening control by increasing and decreasing the field-component voltage based on a negative-field-component current in accordance with the rate of rotation of the rotor by a material of the permanent magnet.

8. The drive unit of claim 7, wherein the permanent magnet comprises a composition containing iron, copper, cobalt, at least one element R selected from rare-earth elements, and at least one element M selected from zirconium, titanium and hafnium, and in the composition, an amount of the element R is 10.8 to 12.5 atomic percent (at %) at %, an amount of the element M is 0.88 to 3.5 at %, and an amount of the copper is 3.5 to 13.5 at %.

9. The drive unit of claim 7, wherein the permanent magnet has a coercivity Hcb on the B-H curve less than or equal to 800 kA/m, and a ratio of a magnetic field Hk90 when the magnetization is 90% of the remnant magnetization to the coercivity Hcj is less than or equal to 70.

10. The drive unit of claim 7, wherein the magnetic pole of the rotor of the rotary electrical machine is formed by providing a permanent magnet having a recoil permeability different from the recoil permeability of the permanent magnet in series and/or in parallel on a magnetic circuit.

11. A vehicle comprising;

an inverter which produces an AC voltage by switching and outputs the AC voltage to the rotary electrical machine as drive power; and a controller which detects a field-component current in the rotary electrical machine, estimates a rate of rotation of the rotor of the rotary electrical machine based on the detected current, obtains a field-component voltage in the rotary electrical machine based on a difference between the estimated rate of rotation of the rotor and a target rate of rotation, and controls the switching of the inverter based on the field-component voltage such that the rate of rotation of the rotor follows the target rate of rotation, wherein the permanent magnet is an R—Co permanent magnet containing 25 to 40 at % iron, where R is at least one element selected from rare-earth elements, wherein the permanent magnet comprises a main phase having a 2-17 crystalline phase and a grain boundary phase provided between the crystalline grains constituting the main phase, the concentration of R in the grain boundary phase is higher than the concentration of R in the main phase, and content of samarium in element R is not less than 50 atomic percent (at %), wherein the permanent magnet has a remnant magnetization greater than or equal to 1.16 T, a coercivity Hcj on an M-H curve greater than or equal to 1000 kA/m, and a recoil permeability on a B-H curve greater than or equal to 1.1, and wherein the controller performs field-weakening control by increasing and decreasing the field-component voltage based on a negative-field-component current in accordance with the rate of rotation of the rotor by a material of the permanent magnet.

12. The vehicle of claim 11, wherein the permanent magnet comprises a composition containing iron, copper, cobalt, at least one element R selected from rare-earth elements, and at least one element M selected from zirconium, titanium and hafnium, and in the composition, an amount of the element R is 10.8 to 12.5 atomic percent (at %), an amount of the element M is 0.88 to 3.5 at %, and an amount of the copper is 3.5 to 13.5 at %.

13. The vehicle of claim 11, wherein the permanent magnet has a coercivity Hcb on the B-H curve less than or equal to 800 kA/m, and a ratio of a magnetic field Hk90 when the magnetization is 90% of the remnant magnetization to the coercivity Hcj is less than or equal to 70.

14. The vehicle of claim 11, wherein the magnetic pole of the rotor of the rotary electrical machine is formed by providing a permanent magnet having a recoil permeability different from the recoil permeability of the permanent magnet in series and/or in parallel on a magnetic circuit.

15. The vehicle of claim 14, wherein the rotary electrical machine is connected to a drive train.

* * * * *